US012567546B2

(12) United States Patent
Mittelstadt et al.

(10) Patent No.: US 12,567,546 B2
(45) Date of Patent: *Mar. 3, 2026

(54) CIRCUIT BREAKERS

(71) Applicant: Schneider Electric USA, Inc., Andover, MA (US)

(72) Inventors: Chad R. Mittelstadt, Cedar Rapids, IA (US); Paul A. Reid, Cedar Rapids, IA (US); Salaheddine Faik, Marion, IA (US); Austin Derby, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 345 days.

This patent is subject to a terminal disclaimer.

(21) Appl. No.: 18/142,464

(22) Filed: May 2, 2023

(65) Prior Publication Data

US 2024/0222040 A1 Jul. 4, 2024

Related U.S. Application Data

(60) Provisional application No. 63/436,443, filed on Dec. 30, 2022.

(51) Int. Cl.

| | |
|---|---|
| ***H01H 3/26*** | (2006.01) |
| ***H01H 9/02*** | (2006.01) |
| ***H01H 9/54*** | (2006.01) |

(52) U.S. Cl.

CPC ................ *H01H 3/26* (2013.01); *H01H 9/02* (2013.01); *H01H 9/54* (2013.01)

(58) Field of Classification Search

CPC .. H01H 3/26; H01H 9/02; H01H 9/54; H01H 71/04; H01H 2071/006; H01H 2071/042

USPC ........................................................... 361/42

See application file for complete search history.

(56) References Cited

U.S. PATENT DOCUMENTS

| | | | | |
|---|---|---|---|---|
| 4,975,673 | A | 12/1990 | Ikehata et al. | |
| 5,120,921 | A * | 6/1992 | DiMarco | H01H 71/501 200/401 |
| 8,169,757 | B2 | 5/2012 | Larson et al. | |
| 2004/0140956 | A1 | 7/2004 | Kushler et al. | |
| 2009/0140871 | A1 * | 6/2009 | Titus | H02H 3/04 345/173 |
| 2010/0149711 | A1 * | 6/2010 | Larson | H01H 71/04 361/93.1 |
| 2010/0236909 | A1 * | 9/2010 | Biedrzycki | H01H 71/04 200/310 |
| 2014/0254052 | A1 | 9/2014 | Carlino et al. | |

(Continued)

OTHER PUBLICATIONS

International Search Report and the Written Opinion for corresponding International Patent Application No. PCT/US2023/084438 dated Apr. 22, 2024, 22 pages.

*Primary Examiner* — Kevin J Comber

(74) *Attorney, Agent, or Firm* — Kinney & Lange, P.A.

(57) ABSTRACT

A circuit breaker can include a housing configured to fit within a slot of a circuit panel and a display configured to display information. The display can include a touch zone configured to allow touch inputs, a variable image zone configured to display trip information, status information, and/or label information, and a fixed image zone configured to display fixed text that is at least partially coincident with the touch zone. Certain embodiments can include a remotely operated circuit breaker with thermal, magnetic, ground fault and arc fault protection.

23 Claims, 24 Drawing Sheets

(56) References Cited

U.S. PATENT DOCUMENTS

| | | | |
|---|---|---|---|
| 2020/0350755 A1 | 11/2020 | Torres et al. | |
| 2023/0069678 A1* | 3/2023 | Madonna .......... | H02J 13/00036 |

* cited by examiner

1100

100

100

1200

1300

CIRCUIT BREAKERS

CROSS-REFERENCE TO RELATED APPLICATIONS

This application claims priority to and the benefit of U.S. Provisional Application No. 63/436,443 filed Dec. 30, 2022, the entire contents of which are herein incorporated by reference in their entirety.

FIELD

This disclosure relates to circuit breakers.

BACKGROUND

Physical volume for extra features and functions is a trade-off that circuit breaker designers constantly face. Traditional devices have limited features without adding size in extra pole widths or without utilizing add-on devices that also use extra space inside the panel.

Such conventional methods and systems have generally been considered satisfactory for their intended purpose. However, there is still a need in the art for improvements. The present disclosure provides a solution for this need.

SUMMARY

A circuit breaker can include a housing configured to fit within a slot of a circuit panel and a display configured to display information. The display can include a touch zone configured to allow touch inputs, a variable image zone configured to display trip information, status information, and/or label information, and a fixed image zone configured to display fixed text that is at least partially coincident with the touch zone.

In certain embodiments, the fixed image zone can be printed text (e.g., behind a glass layer). In certain embodiments, the variable image zone can be a bistable display configured to maintain the displayed image without active power. In certain embodiments, the bistable display can include a landscape text display such that the text is in-line with a long direction of the housing. In certain embodiments, the fixed image zone can include text orthogonal to the bistable display landscape text. In certain embodiments, the fixed image zone can include a "TEST" box coincident with the touch zone. In certain embodiments, the touch zone can be larger than the "TEST" box. In certain embodiments, the touch zone can be coincident with the bistable display and the fixed display zone.

The circuit breaker can include a logic module configured to cause the display to show a label in a normal ON state, display the results of a test in a test state (e.g., test fail information in a test fail state), and trip information in a tripped state. In certain embodiments, the logic module can be configured to cause the label to display on the display in a mechanical or digitally commanded off state.

The circuit breaker can include a mechanical handle configured to move between an ON position and an OFF position. In certain embodiments, the mechanical handle further includes a trip position between the ON position and the OFF position. In certain embodiments, the mechanical handle can include an "ON" label at a portion thereof that is visible in the ON position. The mechanical handle can be configured to move to cause the "ON" label to be blocked by the housing in the trip state and the OFF position.

In certain embodiments, the circuit breaker can include a trip light disposed on the housing behind the mechanical handle. The mechanical handle can be configured to hide at least a portion of the trip light in the ON position. The mechanical handle can be configured to reveal the trip light in the trip position and the OFF position.

In certain embodiments, the logic module can be configured to control a light state based on a state of the breaker. The logic module can be configured to illuminate the trip light to be solid or blinking in one or more patterns to indicate a trip, test status (e.g., fault), or other condition (e.g., other fault state) to a user and to be off in a normal ON state. In certain embodiments, each of the trip, test status, or other condition can include a unique blinking pattern.

The circuit breaker can include an "OFF" label disposed on the housing behind the handle. The mechanical handle can hide the "OFF" label in the ON position and in the trip position. The mechanical handle can reveal the "OFF" label in the OFF position.

In certain embodiments, the logic module can be configured to turn the circuit breaker off in response to a digital command (e.g., a wireless command). In such a scenario, the mechanical handle may not move to the OFF position, and the logic module can be configured to display a digital "OFF" label indicating the breaker is off.

In accordance with at least one aspect of this disclosure, a circuit breaker can include a housing configured to fit within a slot of a circuit panel, a display configured to display information, a logic module, a trip light disposed on the housing, and a mechanical handle configured to move between an ON position and an OFF position. The mechanical handle can be any suitable mechanical handle disclosed herein. The circuit breaker can include any other suitable features as disclosed herein.

In accordance with at least one aspect of this disclosure, a circuit breaker can include a set of electrical contacts configured to move between an open position and a closed position, a remote control motor, a remote control mechanism connected to the remote control motor and configured to cause the electrical contacts to move to the open position or the closed position via remote control of the remote control motor, a mechanical assembly configured to link the remote control mechanism to the electrical contacts, a wireless transmitter and receiver communication system, and a circuit board, comprising a protection module configured to provide arc fault protection, and ground fault protection, a wireless communication module operatively connected to the radio transmitter and receiver communication system to provide wireless communication, and a motor control module configured to control the motor based on one or more wireless commands from a user or external system. The circuit breaker also includes a bistable display configured to show variable dynamic information relating to breaker status, fault parameters, QR codes, circuit identifiers, or other information. The circuit board can be connected to line side power to stay powered regardless of the position of the electrical contacts.

In accordance with at least one aspect of this disclosure, a remote control circuit breaker can include one or more components configured to move a set of electrical contacts from a closed position to an open position to provide electrical protection to a circuit, a remote controlled motor, and a circuit board configured to control the motor and to provide wireless communication to allow a user or external system to wirelessly control the motor, wherein the circuit board is configured to connect to line side power to stay powered regardless of the position of the electrical contacts.

The remote control circuit breaker can also include a display connected to the circuit board to be controlled by the circuit board.

In accordance with at least one aspect of this disclosure, a circuit breaker can include a means for providing arc fault protection, ground fault protection, thermal protection, magnetic protection, remote control of contact state, and a user interface with a variable image display in a standard size circuit breaker format. Certain embodiments do not require additional space over standard size breaker formats (e.g., single pole, two pole, etc.).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
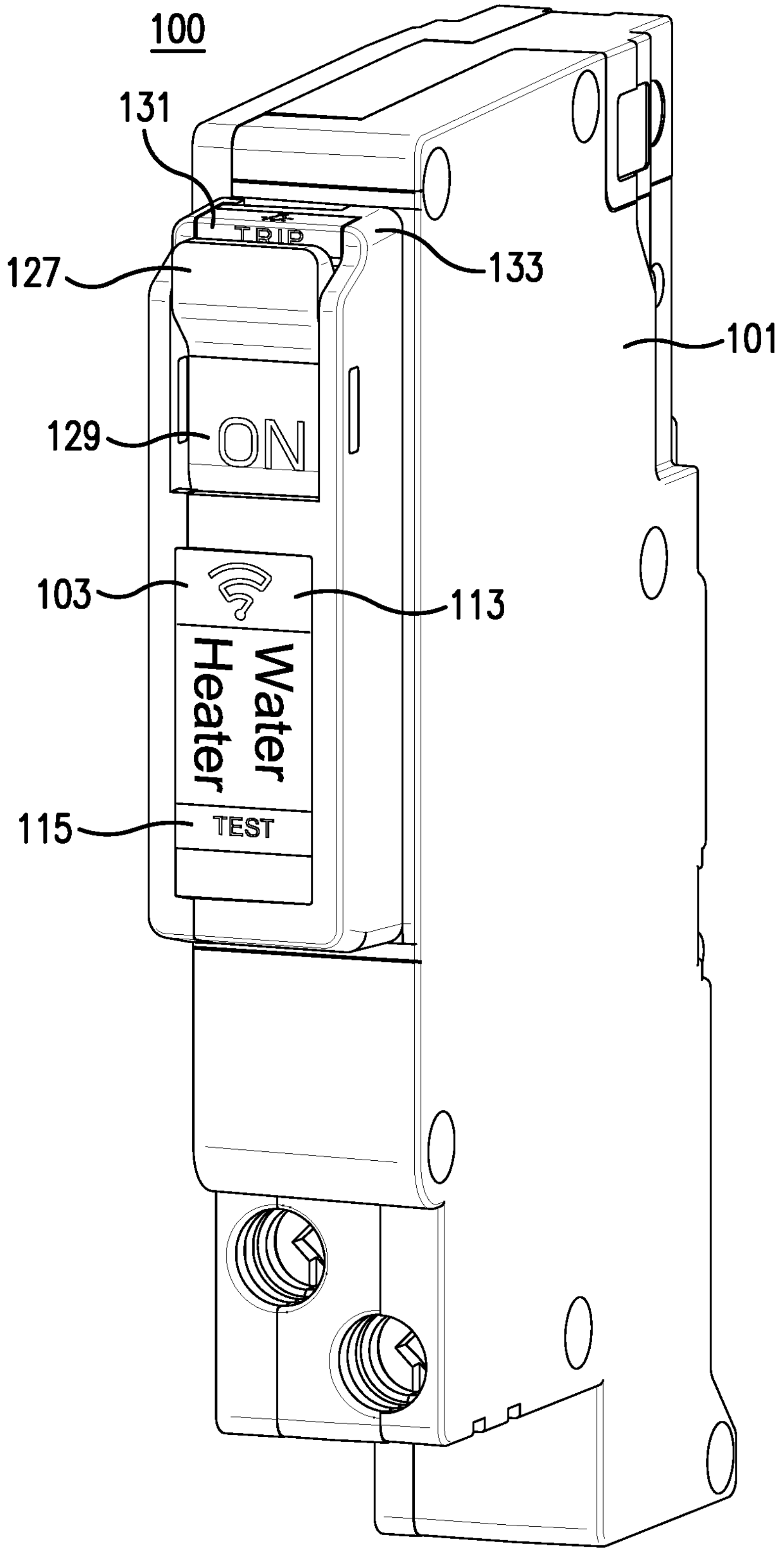
FIG. 1 is a perspective view of an embodiment of a circuit breaker in accordance with this disclosure.

Reference will now be made to the drawings wherein like reference numerals identify similar structural features or aspects of the subject disclosure. For purposes of explanation and illustration, and not limitation, an illustrative view of an embodiment of a circuit breaker in accordance with the disclosure is shown in FIG. 1 and is designated generally by reference character 100. Other embodiments and/or aspects of this disclosure are shown in FIGS. 2-11.

Figure 2:
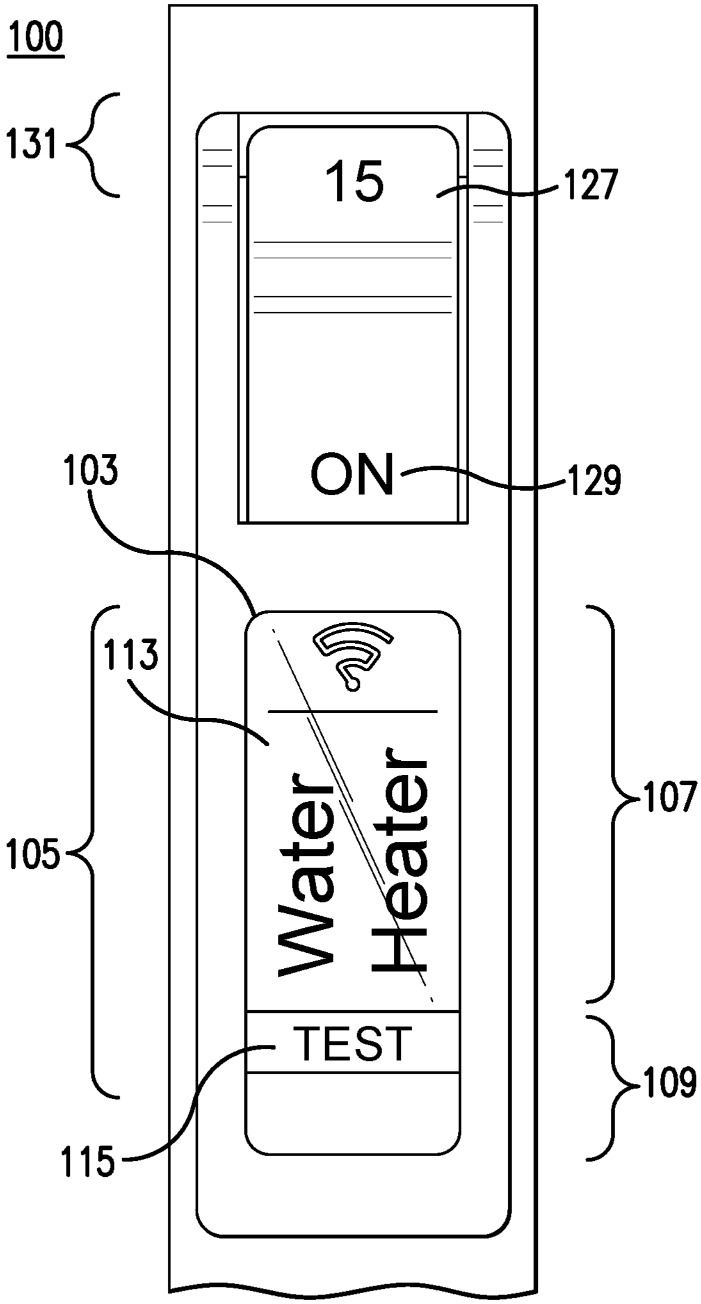
FIG. 2 is a front elevation view of the embodiment of FIG. 1.
Figure 3:
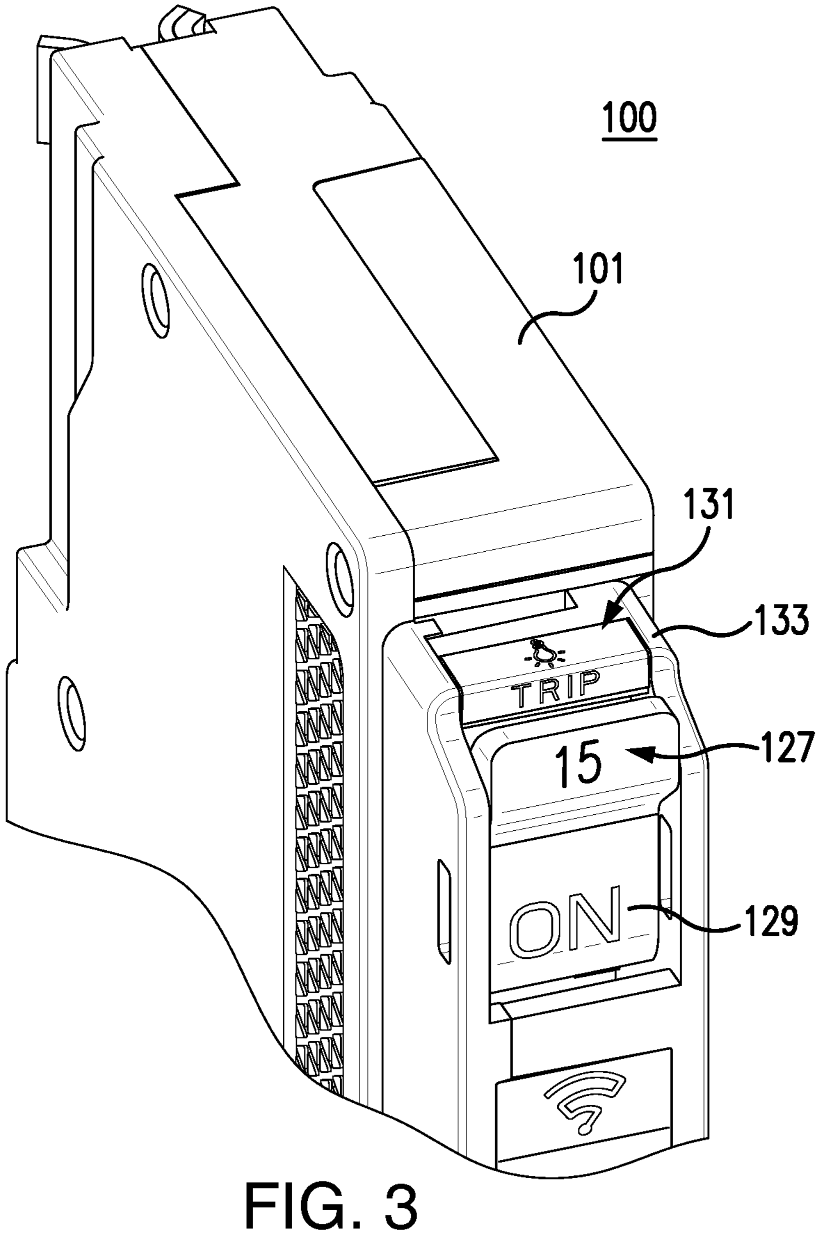
FIG. 3 is a top perspective view of the embodiment of FIG. 1.
Figure 4:
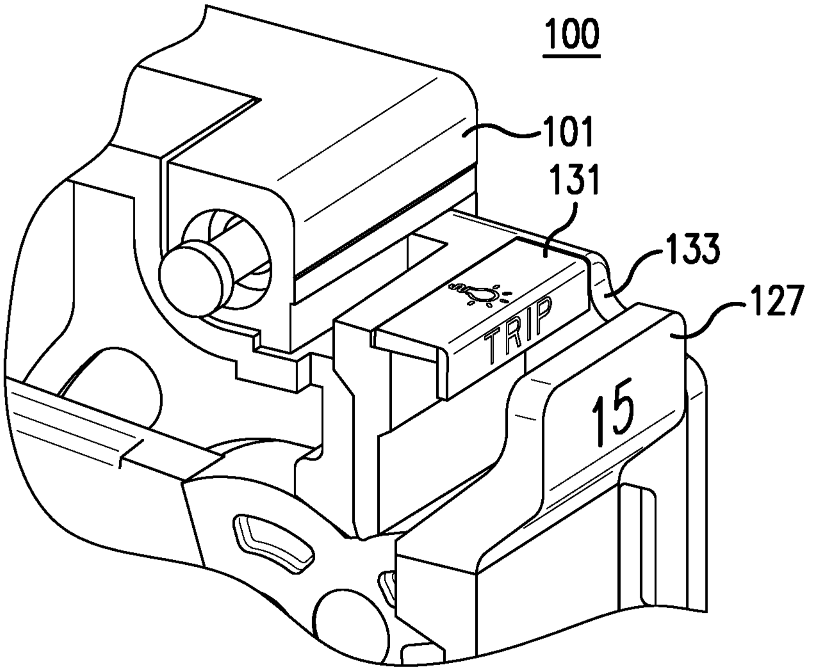
FIG. 4 is a schematic perspective view illustrating an embodiment of a trip light relative to a handle in accordance with this disclosure.
Figure 5:
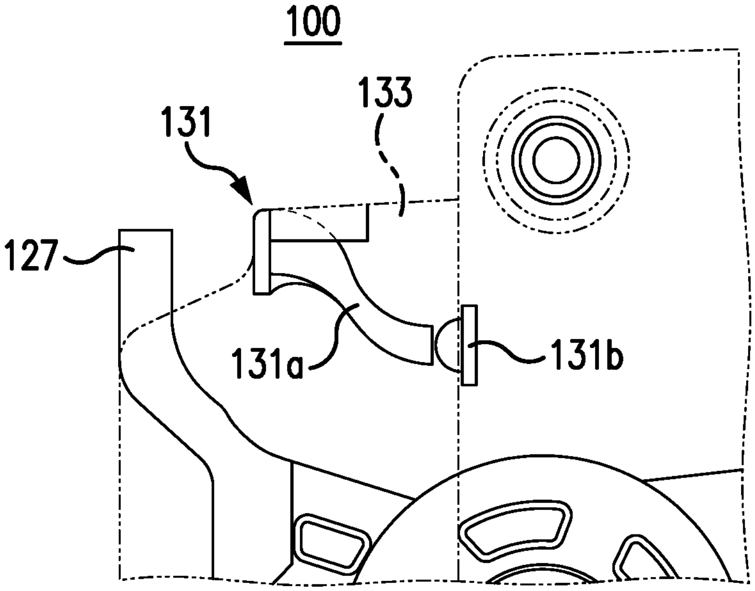
FIG. 5 is a schematic elevation view showing the trip light of FIG. 4 having a light pipe within the housing.
Figure 6:
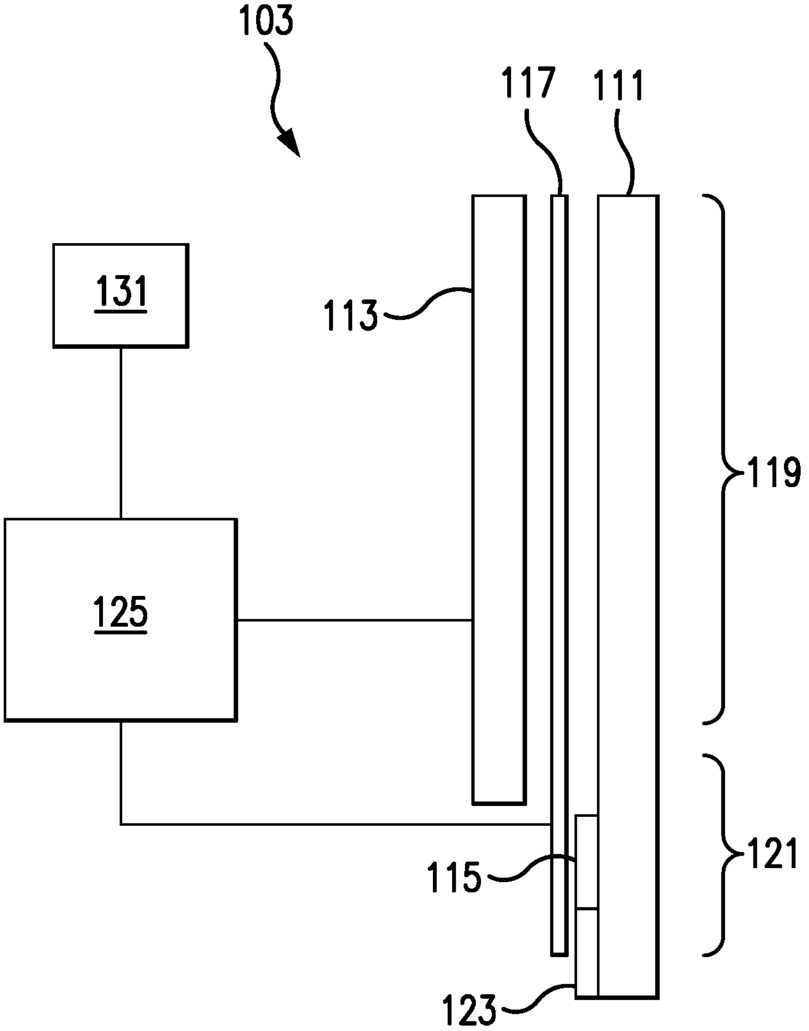
FIG. 6 shows an exploded view of an embodiment of a display in accordance with this disclosure.
Figure 11:
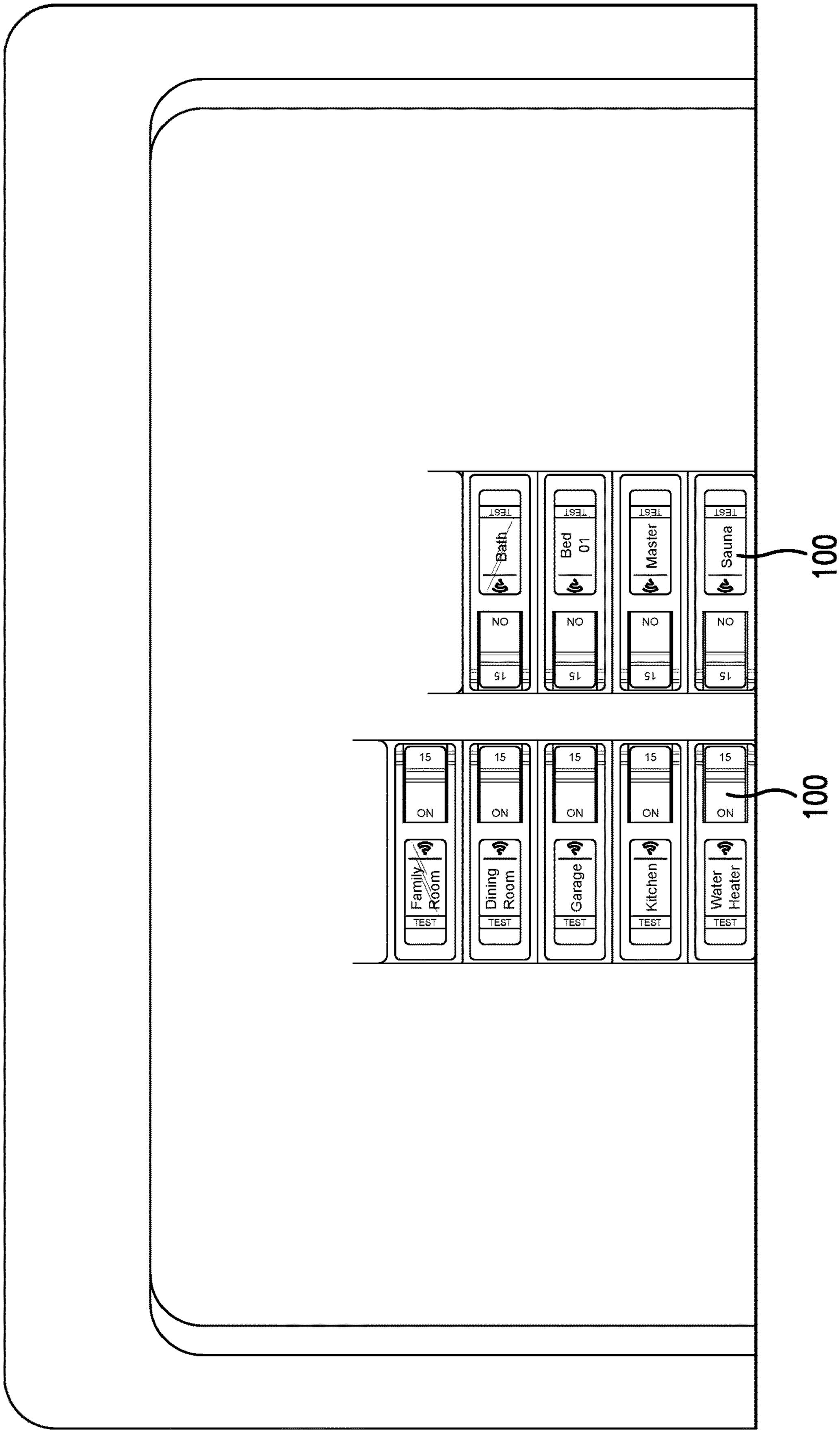
FIG. 11 shows a portion of a circuit breaker panel having a plurality of embodiments of FIG. 1 shown installed therein.

Referring to FIGS. 1-6, a circuit breaker 100 can include a housing 101 configured to fit within a slot of a circuit panel (e.g., as shown in FIG. 11) and a display 103 configured to display information. As shown in FIGS. 2 and 6, the display 103 can include a touch zone 105 configured to allow touch inputs, a variable image zone 107 configured to display trip information, status information, and/or label information, and a fixed image zone 109 configured to display fixed text that is at least partially coincident with the touch zone 105.

In certain embodiments, the fixed image zone 109 can be printed text (e.g., behind a glass layer 111). In certain embodiments, the variable image zone 107 can be or include a bistable display 113 configured to maintain the displayed image without active power. In certain embodiments, the bistable display 113 can include a landscape text display such that the text is in-line with a long direction of the housing 101 (e.g., as shown). In certain embodiments, the fixed image zone 109 can include text orthogonal to the bistable display 113 landscape text (e.g., as shown).

In certain embodiments, the fixed image zone 109 can include a "TEST" box 115 coincident with the touch zone 105 configured to initiate a test function when touched. In certain embodiments, the touch zone 105 associated with the "TEST" box 115 can be larger than the "TEST" box 115 (e.g., to provide a wider touch area to initiate a test function). In certain embodiments, the touch zone 105 can be coincident with the bistable display 113 and the fixed display zone 109. For example, as shown in FIG. 6, the bistable display 113 can underlay a capacitive film 117 that defines the touch zone 105. The capacitive film 117 can be longer than the bistable display 113 as shown, and extend under or over the printed "TEST" box 115. The capacitive film 117 can fully encompass the "TEST" box 115 and can extend beyond the "TEST" box 115, e.g., as shown. A layer of glass 111 can overlay the all components. As shown, the capacitive film 117 can have a user interface (UI) touch space 119 such that the user can interact with the variable image display 107, and a test button area 121 which activates a test function when touched. The test button area 121 can be oversized relative to the "TEXT" box 115 such that there is less user error and/or attempts to initiate a test. The test button area 121 may extend to be coincident with other printed markings, e.g., brand marking 123.

Figure 7A:
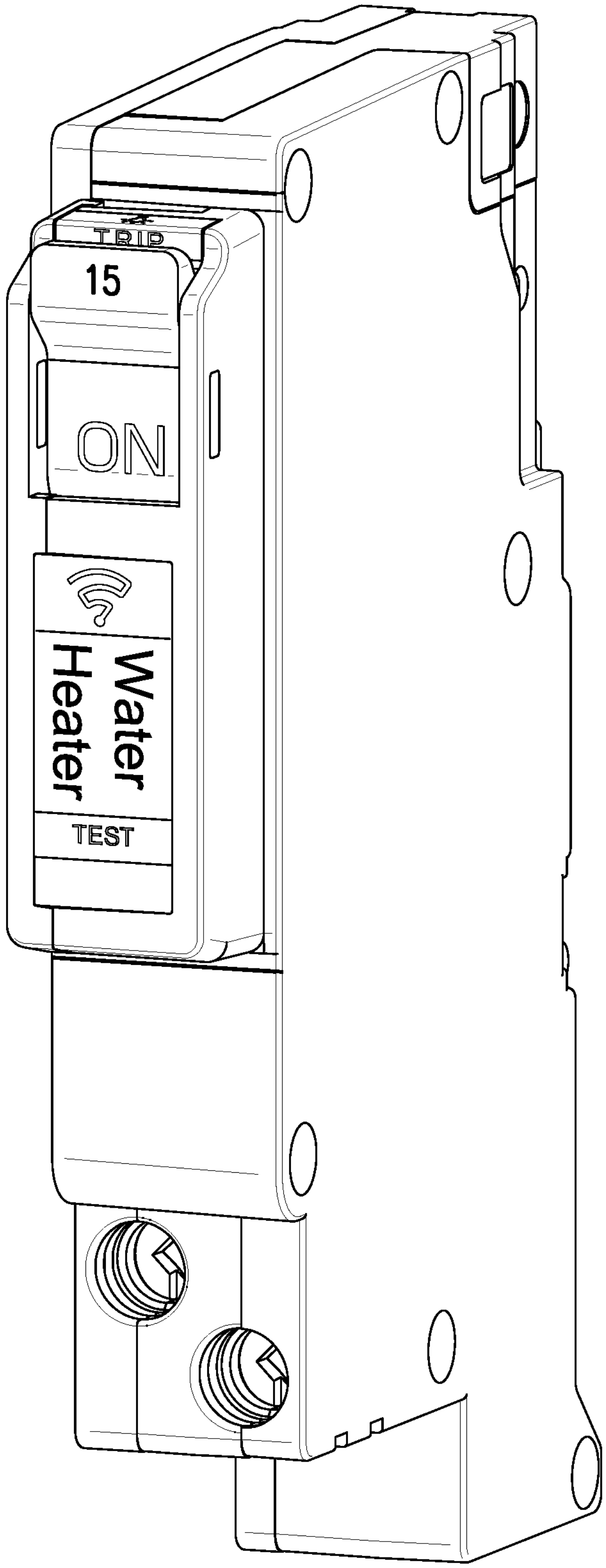
FIG. 7A is a perspective view of the embodiment of FIG. 1, shown in a normal ON state.
Figure 7B:
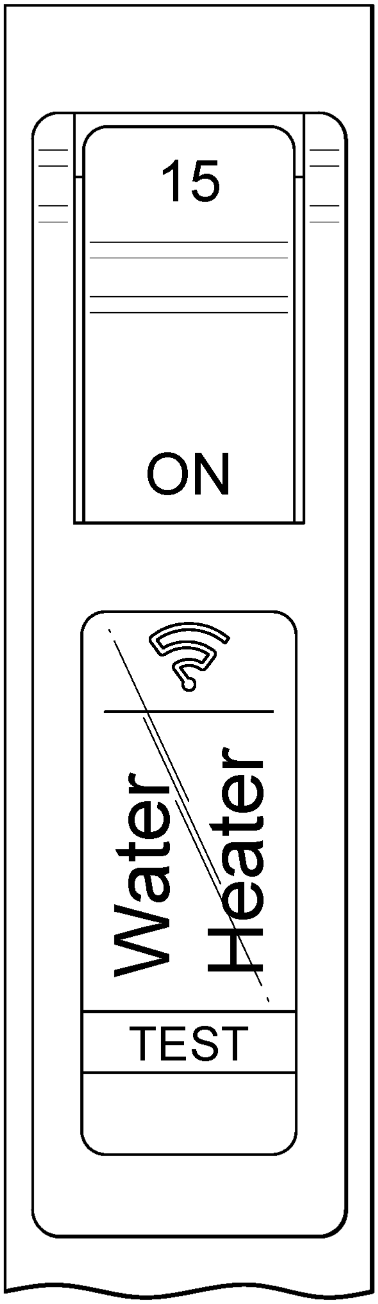
FIG. 7B is an elevation view of the embodiment of FIG. 1, shown in a normal ON state.
Figure 8A:
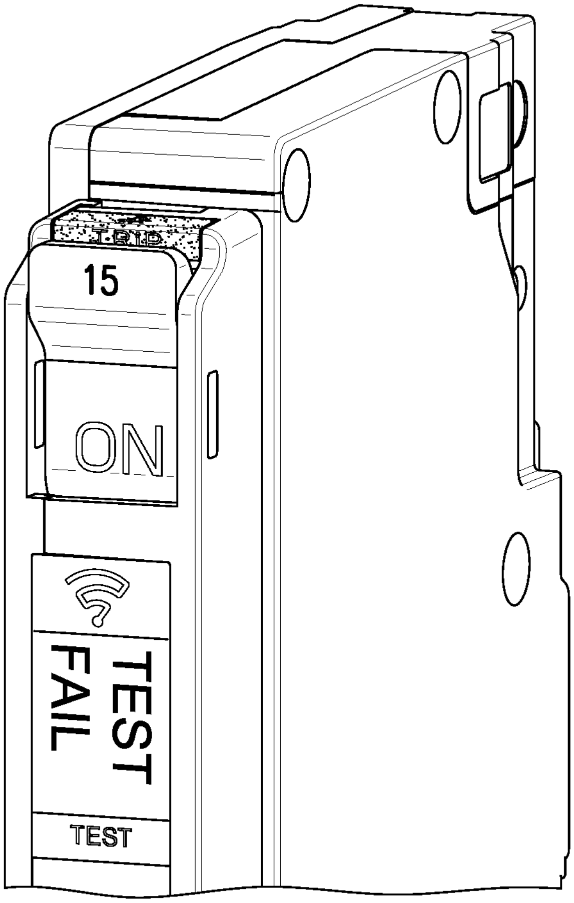
FIG. 8A is a perspective view of the embodiment of FIG. 1, shown in a fail test state, wherein the test light is indicated as on either solid or blinking.
Figure 8B:
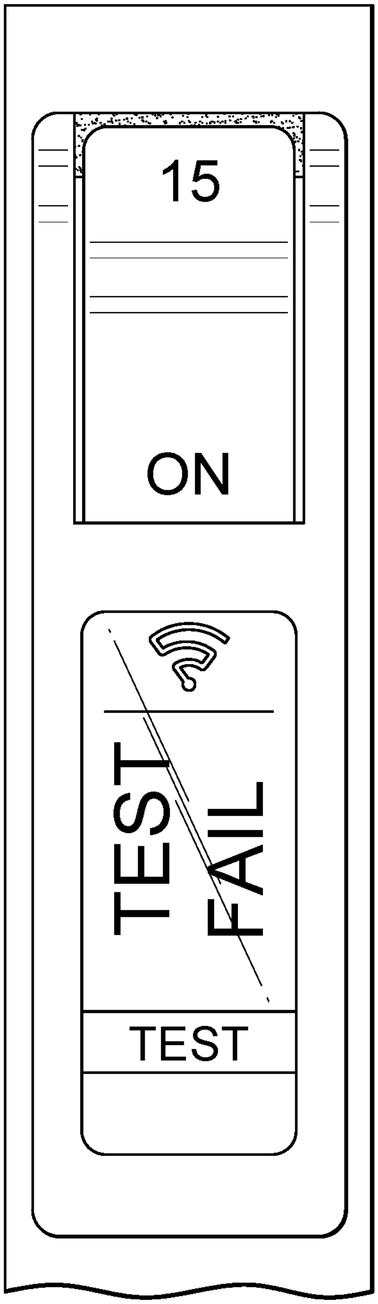
FIG. 8B is an elevation view of the embodiment of FIG. 1, shown in a fail test state.
Figure 9A:
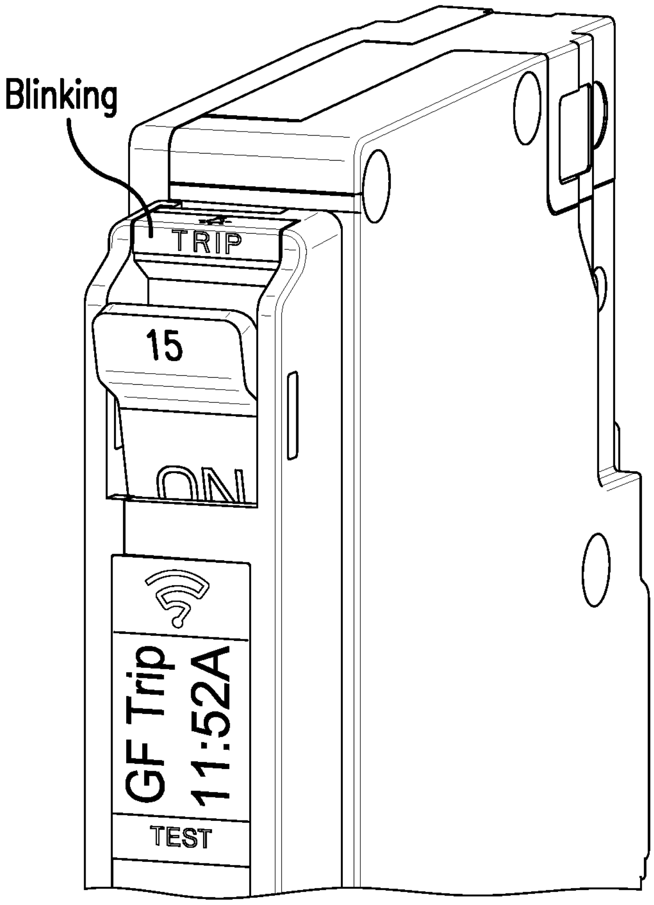
FIG. 9A is a perspective view of the embodiment of FIG. 1, shown in a trip state, wherein the mechanical handle is in a trip position, and the trip light is revealed by the mechanical handle.
Figure 9B:
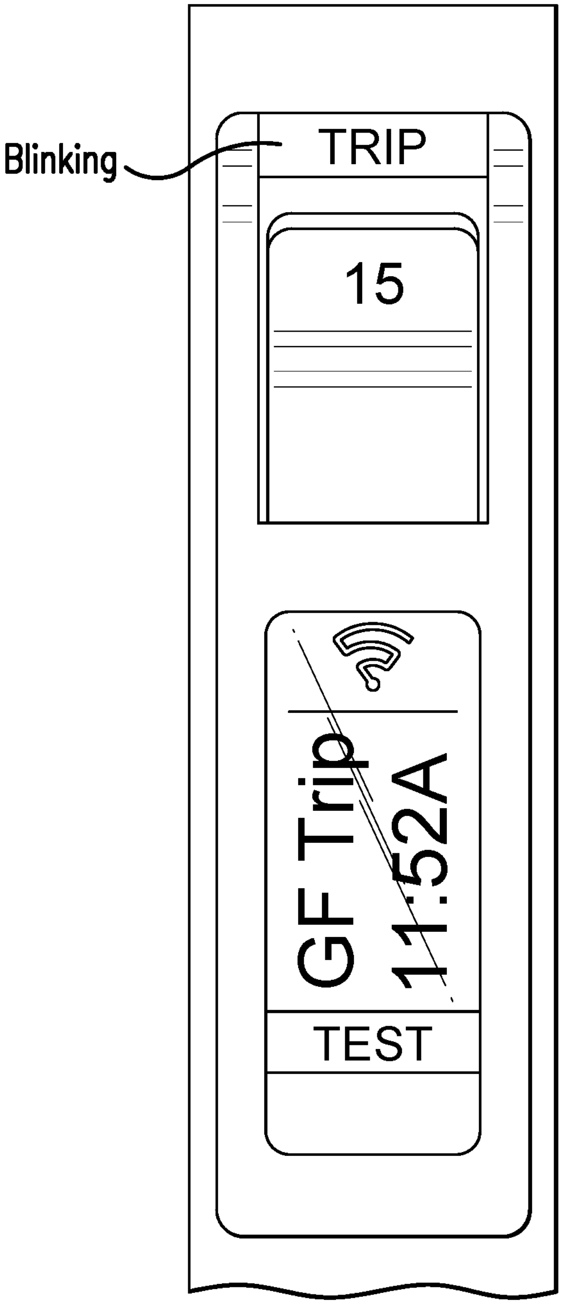
FIG. 9B is an elevation view of the embodiment of FIG. 1, shown in a trip state.
Figure 9C:
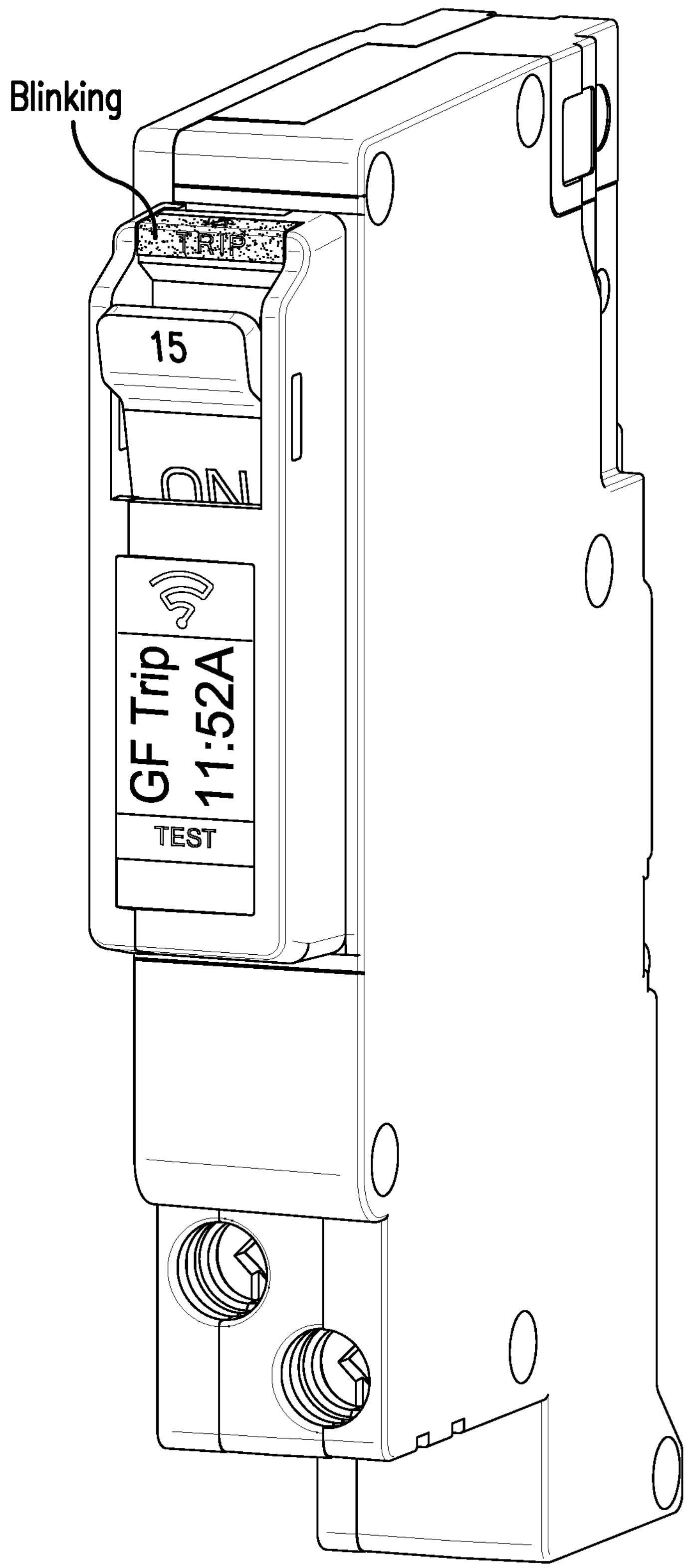
FIG. 9C is a perspective view of the embodiment of FIG. 1, shown in a trip state, wherein the trip light is shown on indicating it is blinking in the trip state.

The circuit breaker 100 can include a logic module 125 configured to cause the display 103 to show a label (e.g., a custom circuit name input by a user) in a normal ON state (e.g., as shown in FIGS. 7A and 7B), display the results of a test in a test state (e.g., test fail information in a test fail state, e.g., as shown in FIGS. 8A and 8B), and trip information in a tripped state (e.g., a trip state as shown in FIGS. 9A-9C). In certain embodiments, the outcome of the test can be displayed after a test is performed. In certain embodiments, circuit breaker status can be displayed after a trip occurs along with the reason for the trip. Fault information can be displayed and can describe whether the fault is in the product or has been detected on the system, for example. Any other suitable test results information or status information is contemplated herein. In certain embodiments, the logic module 125 can be configured to cause the label to display on the display 103 in a mechanical or digitally commanded off state (e.g., as shown in FIGS. 10A-10C).

Figure 10A:
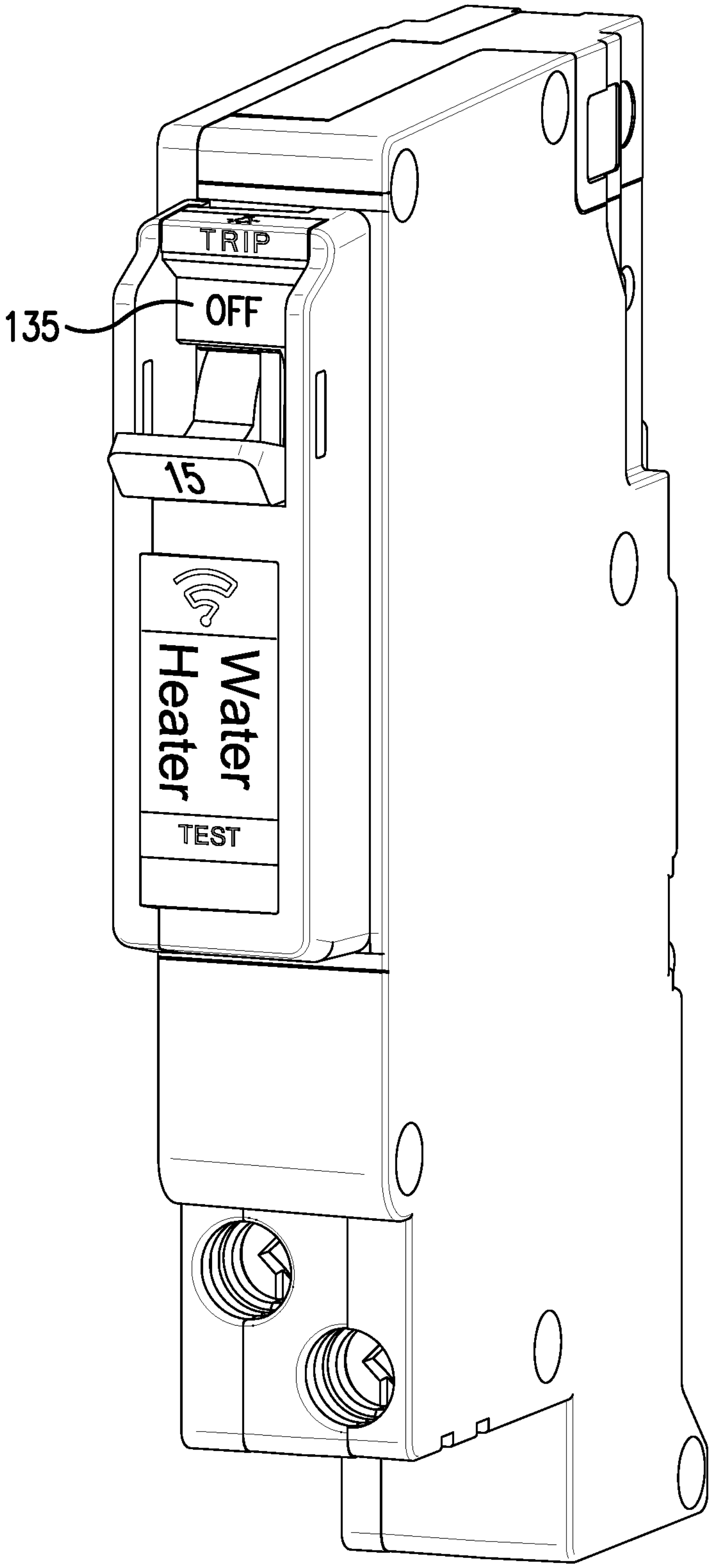
FIG. 10A is a perspective view of the embodiment of FIG. 1, shown in a mechanical OFF state, showing an "OFF" label exposed.
Figure 10B:
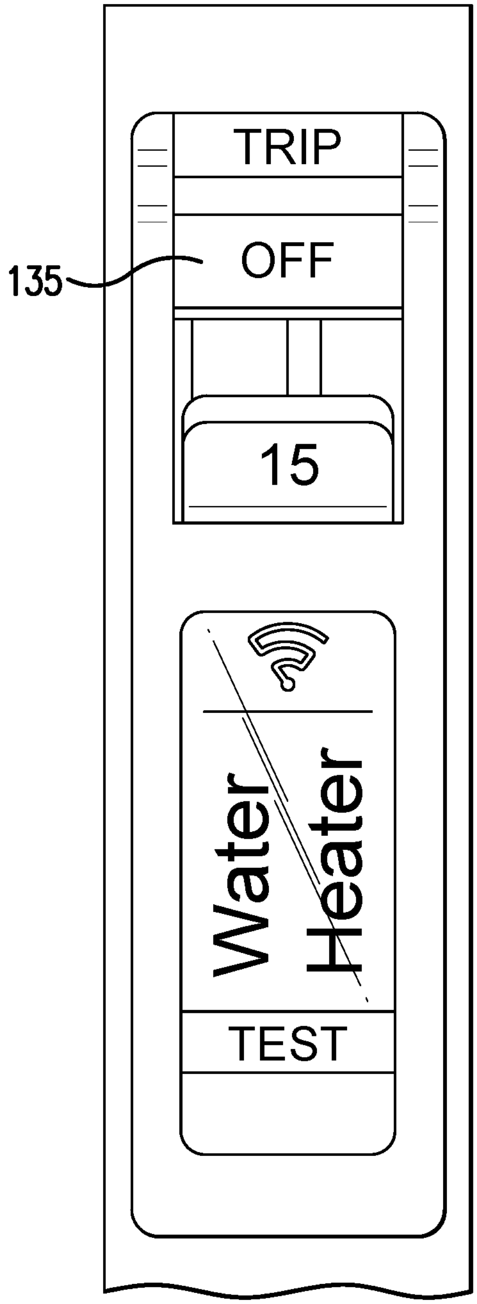
FIG. 10B is an elevation view of the embodiment of FIG. 1, shown in a mechanical OFF state.
Figure 10C:
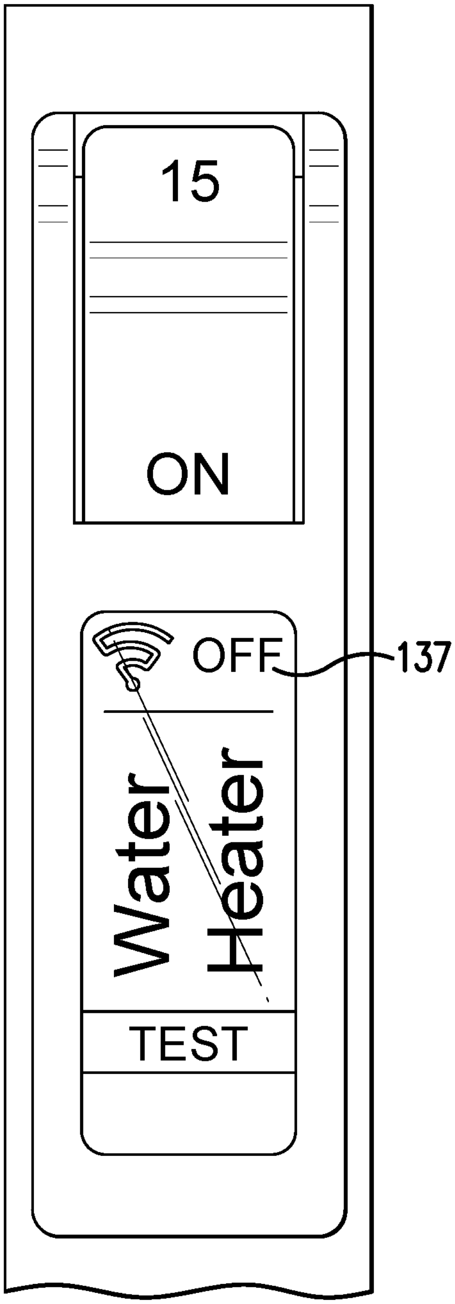
FIG. 10C is an elevation view of the embodiment of FIG. 1, shown in a digital OFF state, wherein the mechanical handle is not moved to the OFF position, and the display indicates the "OFF" label.

The circuit breaker 100 can include a mechanical handle 127 configured to move between an ON position (e.g., as shown in FIGS. 7A and 7B) and an OFF position (e.g., as shown in FIGS. 10A and 10B). The mechanical handle 127 can be configured to mechanically open and close electrical contacts of the circuit breaker 100. In certain embodiments, the mechanical handle 127 further includes a trip position between the ON position and the OFF position (e.g., as shown in FIGS. 9A-9C). This trip position can be a stable position between the ON position and the OFF position of the mechanical handle 127. In certain embodiments, the mechanical handle 127 can include an "ON" label 129 at a portion thereof that is visible in the ON position. The mechanical handle 127 can be configured to move to cause the "ON" label to be blocked by the housing 101 in the trip state and the OFF position (e.g., as shown in FIGS. 9A-10B).

In certain embodiments, the circuit breaker 100 can include a trip light 131 disposed on the housing 101 behind the mechanical handle 127, e.g., on a shoulder 133 of the housing 101. The mechanical handle 127 can be configured to hide at least a portion of the trip light 131 in the ON position (e.g., as shown in FIGS. 8A and 8B). The mechanical handle 127 can be configured to reveal the trip light 131 in the trip position and the mechanical OFF position (e.g., as shown in FIGS. 9A-10B).

In certain embodiments, the logic module 125 can be configured to control a light state based on a state of the breaker 100. The logic module 125 can be configured to illuminate the trip light 131 to be solid or blinking in one or more patterns to indicate a trip, test status, or other condition to a user and to be off in a normal ON state. In certain embodiments, each of the trip, test status, or other condition can include a unique blinking pattern. For example, a test status can be indicated by a solid illumination of the trip light 131. A ground fault trip can be indicated by a flashing illumination of the trip light 131 having a first rate of flash and/or a first flash pattern. A different fault trip can be indicated by a flashing illumination of the trip light 131 having a second rate of flash and/or a second flash pattern. Any suitable patterns and/or rates of flashing to indicate any number of faults are contemplated herein. In certain embodiments, different blinking patters can be used to indicate the reason that the circuit breaker tripped (e.g., to tell the user what type of electrical fault was detected, such as a ground fault, arc fault, etc.). In certain embodiments, the trip light 131 can also be used to indicate an end-of-life condition to indicate that the circuit breaker should be replaced.

The logic module 125 can be configured to additionally or alternatively display a circuit breaker status message on the variable image zone 107. Any suitable information to indicate a trip type or state is contemplated herein (e.g., "GF trip" in a ground fault trip, and/or a time of trip as shown in FIGS. 9A-9C).

The circuit breaker 100 can include an "OFF" label 135, e.g., as shown in FIGS. 10A and 10C, disposed on the housing 101 behind the handle 127. The mechanical handle 127 can hide the "OFF" label 135 in the ON position (e.g., as shown in FIGS. 8A and 8B) and in the trip position (e.g., as shown in FIGS. 9A-9C). The mechanical handle 127 can reveal the "OFF" label in the mechanical OFF position, e.g., as shown in FIGS. 10A and 10B.

In certain embodiments, the logic module 125 can be configured to turn the circuit breaker 100 off in response to a digital command (e.g., a wireless command). The breaker 100 can include a motor (not shown) configured to actuate the contacts between the on state and the off state, irrespective of handle position. In certain embodiments, the contacts cannot be closed by the motor mechanism when the handle is not in the ON state such that only when the handle is in the ON state can the motor actuate the contacts to the ON state. The motor can actuate the contacts to the OFF state when the handle is in the ON position. The logic module 125 can be configured to operate the motor in response to a command and/or in accordance with logic. For example, the logic module 125 can be configured to wirelessly communicate (e.g., via the internet, via a direct connection, and/or via a local wireless system) with another device (e.g., smart device, a computer) to allow control of the breaker 100 with the other device. In such a scenario, the mechanical handle 127 may not move to the OFF position as shown in FIG. 10C, and the logic module 125 can be configured to display a digital "OFF" label 137 indicating the breaker 100 is off.

FIG. 11 shows a portion of a circuit breaker panel 1100 having a plurality of embodiments of FIG. 1 shown installed therein. The panel 1100 can include any suitable number of circuit breakers 100 disclosed herein, and/or any other suitable breaker types. For example, installations can be vertical. Embodiments can be capable of rotating the text on the display such that the text is in the proper orientation regardless of the orientation of the circuit breaker as installed (right or left side, sideways or vertical).

In accordance with at least one aspect of this disclosure, a circuit breaker (e.g., breaker 100, can include a housing 101 configured to fit within a slot of a circuit panel 1100, a display configured to display information, a logic module 125, a trip light 131 disposed on the housing 101, and a mechanical handle 127 configured to move between an ON position and an OFF position. The mechanical handle 127 can be any suitable mechanical handle 127 disclosed herein. The logic module 125 can be any suitable module 125 disclosed herein. The circuit breaker 100 can include any other suitable features as disclosed herein.

Embodiments can include a trip light 131 moved from below the handle 127 to now above the handle 127 which is hidden by the handle in the ON state. This light can blink in certain trip conditions (e.g., ground fault), for example.

Light patterns can be a reliable and/or redundant way to indicate a specific electrical fault type (e.g., in the event the display 103 cannot otherwise display the cause of the trip). Any suitable light patterns are contemplated herein. The trip light can include a light pipe 131*a* that diffuses light from an LED 131*b*, for example.

Embodiments can include a handle that rotates up to cover the TRIP indicator when on, and can have a mechanical flag for "ON" visible only when rotated up. The handle can be long enough to cover a portion of the trip light, not the whole trip light, in certain embodiments. The handle can be dimensioned to cover the word "TRIP" on the trip light mostly or completely.

Embodiments can include a display with a capacitive touch area behind physical test and logo symbols. The touch area can include an oversized test button area that mismatches with the word "TEST" to provide a wider activation area. Certain text, e.g., "TEST" and a logo can be physically printed and behind glass. The logic module can control what is displayed on the variable image zone and can be configured to process inputs from the capacitive touch area to either allow the user to interface with the device and/or initiate a test function. For example, if the test button is touched/pushed, the logic module can initiate self-test and present the results on the display. In certain embodiments, the logic module can output a positive indication to the display (e.g., the word "PASSED") if there is no detected problem. In this regard, the display can include a dynamic screen with real-time feedback.

Embodiments can include a miniature circuit breaker with advanced protection, remote control, communication and touch display in a single pole width format. Physical volume for extra features and functions is a trade-off circuit breaker designers constantly face. Until now, no other device has the ability to do every feature disclosed herein without adding size in extra pole widths or add-on devices that also use extra space inside the panel.

Embodiments can allow all the features to be offered while not using any more circuit spaces inside the electrical panel than traditional thermal magnetic circuit breakers that do not have advanced protection, remote control, communication or a display that can provide rich information. Traditional advanced function circuit breakers add a pole space for added volume to house communication and UI indicator components. Other solutions on the market today can only achieve all the features disclosed herein using an external control device. This adds cost, increases space used inside the panel, and raises the complexity of the system.

Embodiments can include an advanced protection circuit breaker with multiple functions (e.g., arc fault, ground fault, thermal and magnetic) and can add a compact stored energy motor mechanism to open and close the electrical contacts via remote control, a mechanical means to link the remote control mechanism to the traditional primary electrical contacts, a motor control circuit that integrates with the protection, communication, and supervisory circuits in the breaker, a radio transmitter and receiver communication system to connect to the remote control means, an innovative bistable display (e-ink like) that can show local users rich variable dynamic information about breaker status, fault parameters, QR codes, circuit identifiers but also has permanent markings for UL standards testing compliance, a display with two regions of touch function (one to initiate UL standards user test checks and two for the user to interact with the display to get other information and/or to digitally change the state of the breaker to be open or closed), and the software and firmware to execute all the functions of the other elements.

Embodiments have components to achieve a function with a minimum number of components and smallest footprint, and all components can work in concert to operate the breaker, interact with the outside connected system, interface with users locally, and meet applicable codes and standards.

Figure 12A:
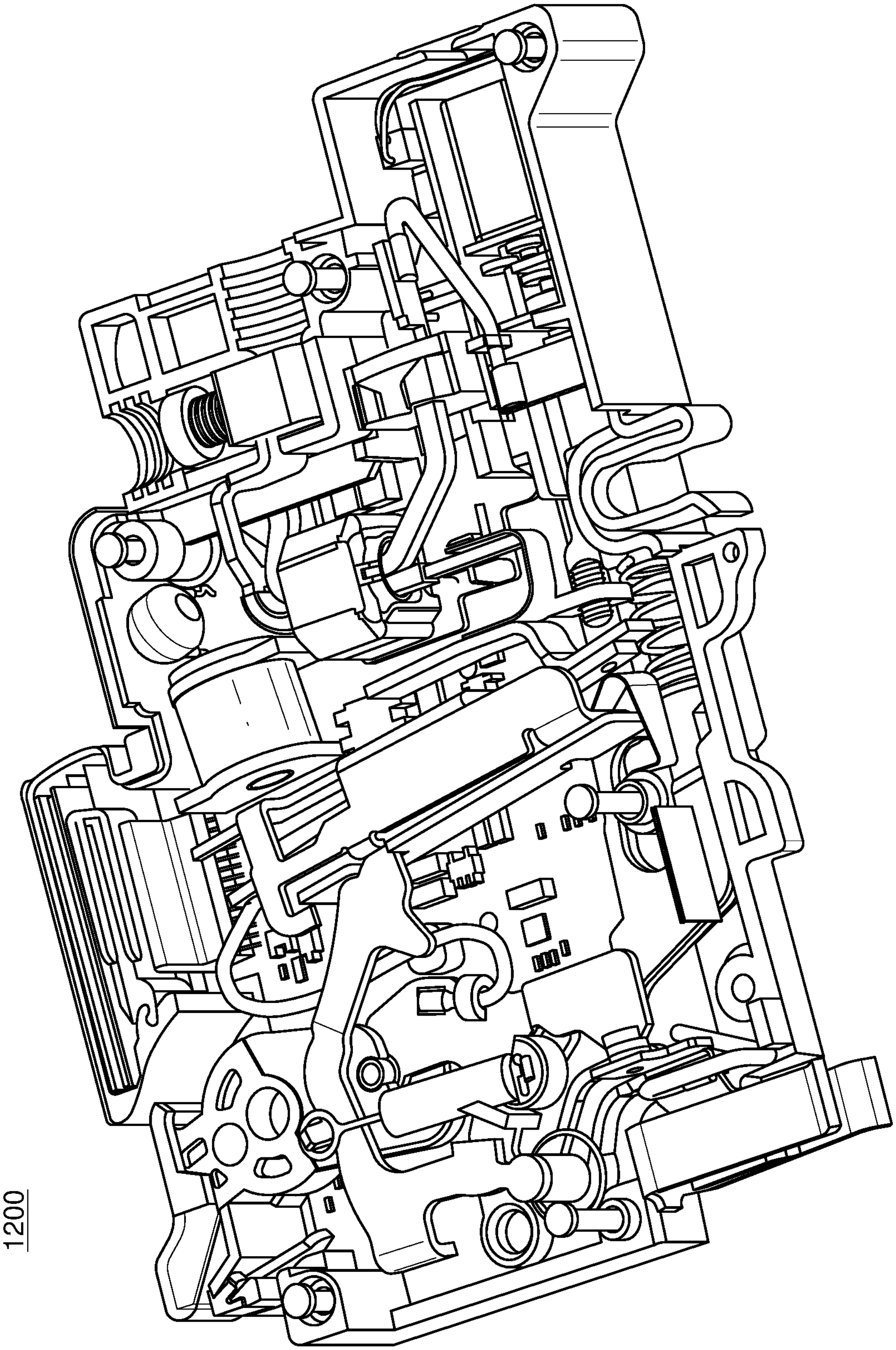
FIG. 12A shows a perspective view of an embodiment of a circuit breaker in accordance with this disclosure in a single pole format, showing interior components having a portion of housing removed.
Figure 12B:
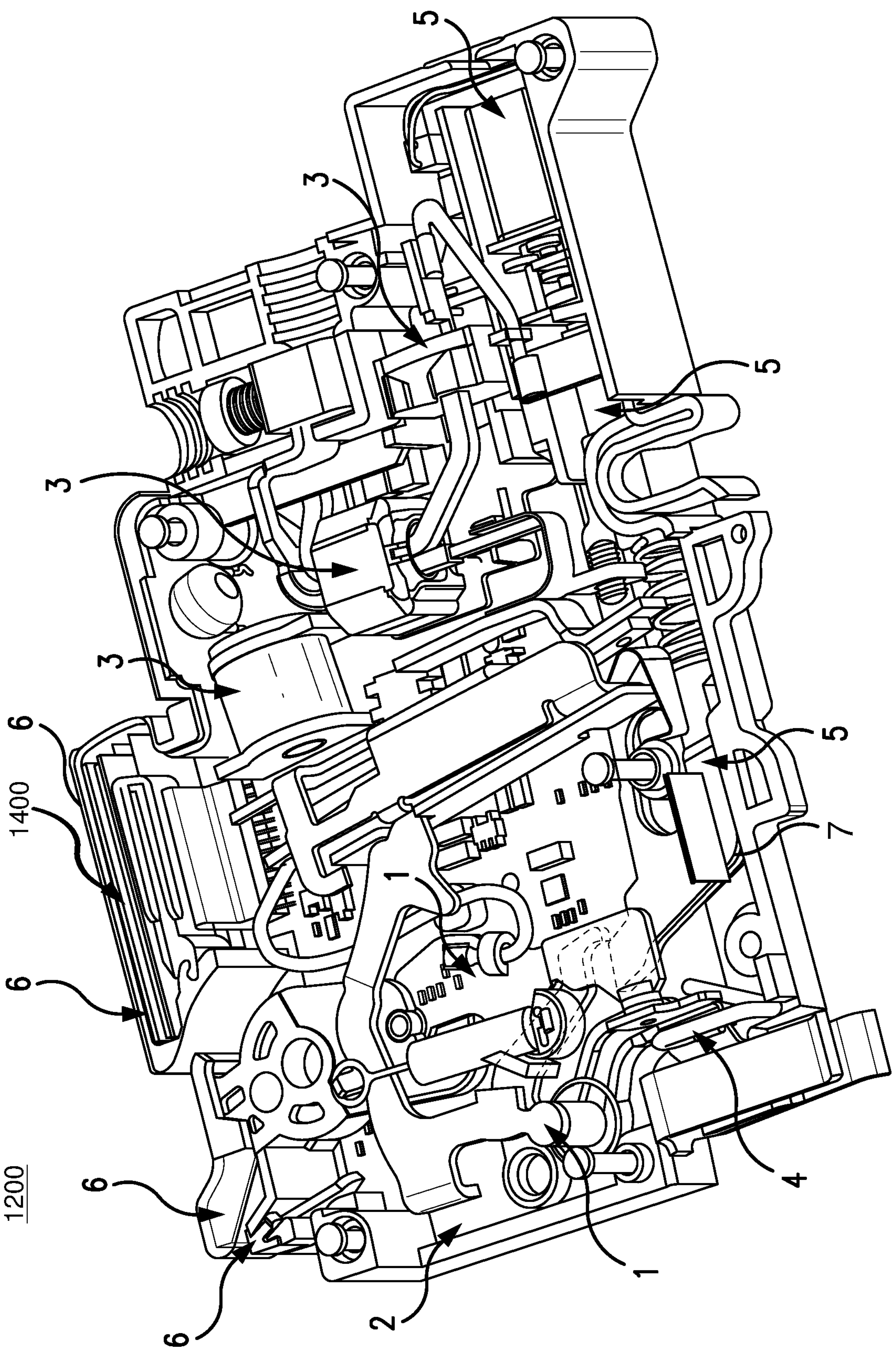
FIG. 12B shows a perspective view of the embodiment of FIG. 12A, shown having the electrical contacts in phantom.
Figure 13A:
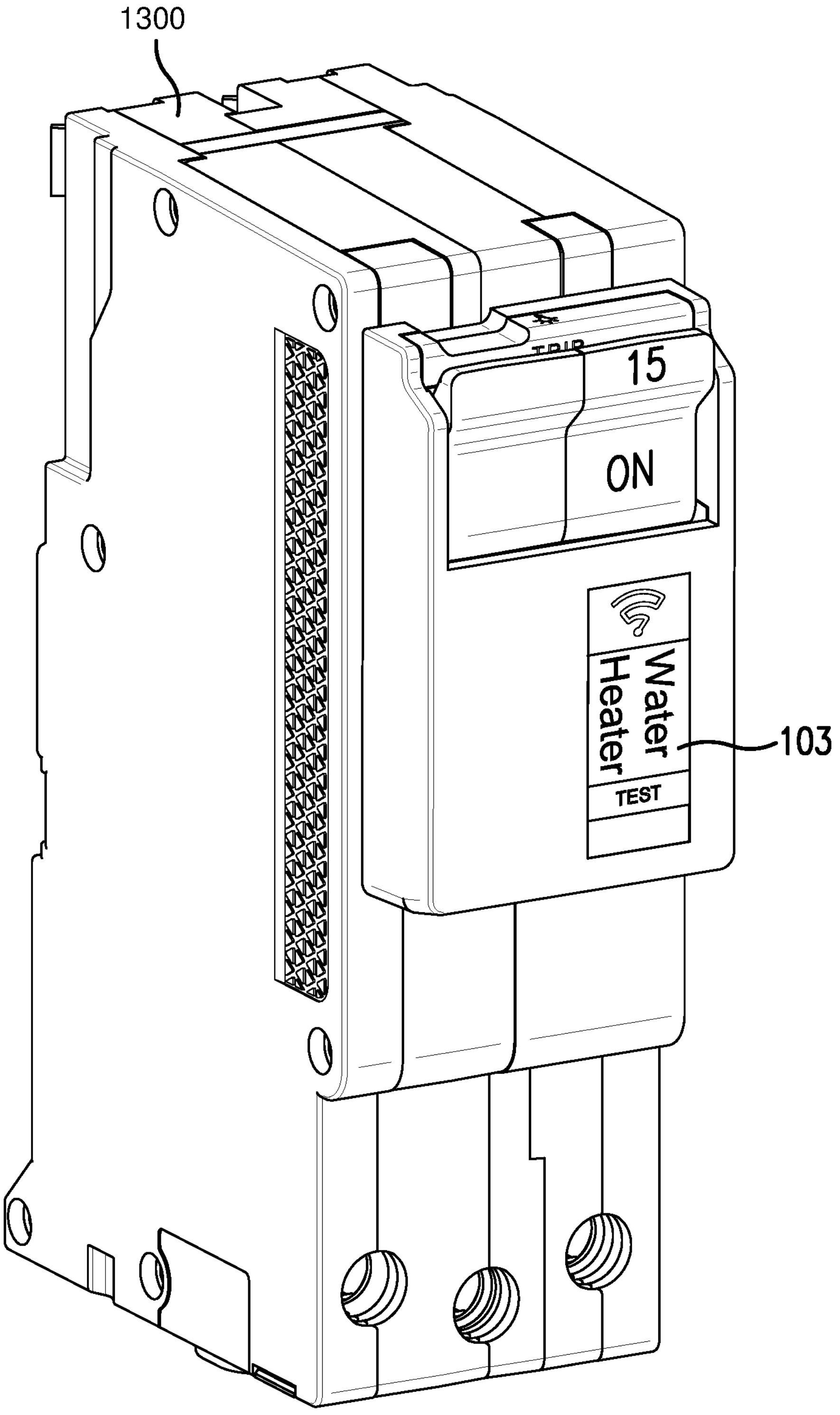
FIG. 13A is a perspective view of an embodiment of a circuit breaker in accordance with this disclosure in a two pole format.
Figure 13B:
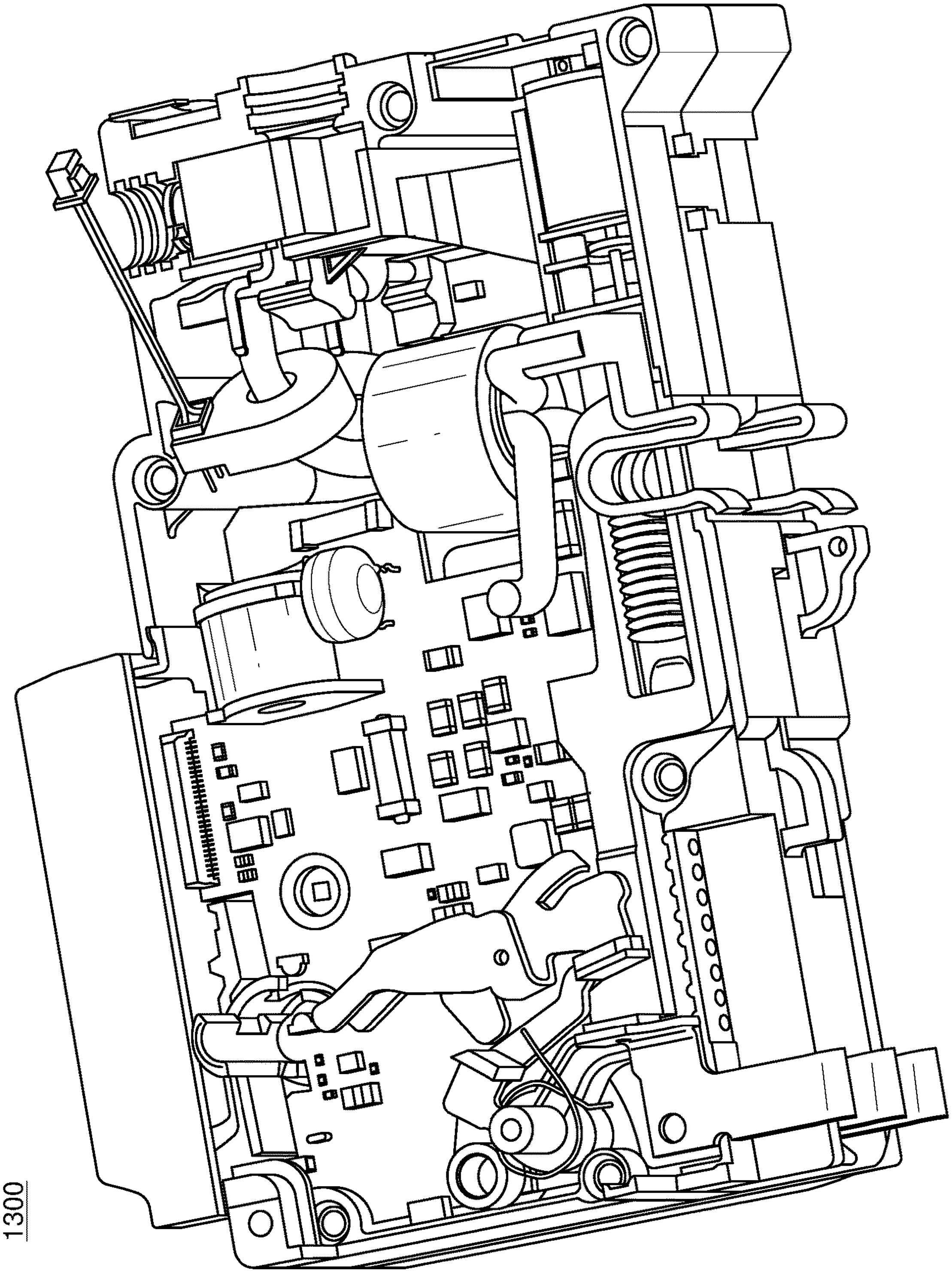
FIG. 13B shows a perspective partial internal view of an embodiment of FIG. 13B, showing interior components having a portion of a housing removed.
Figure 13C:
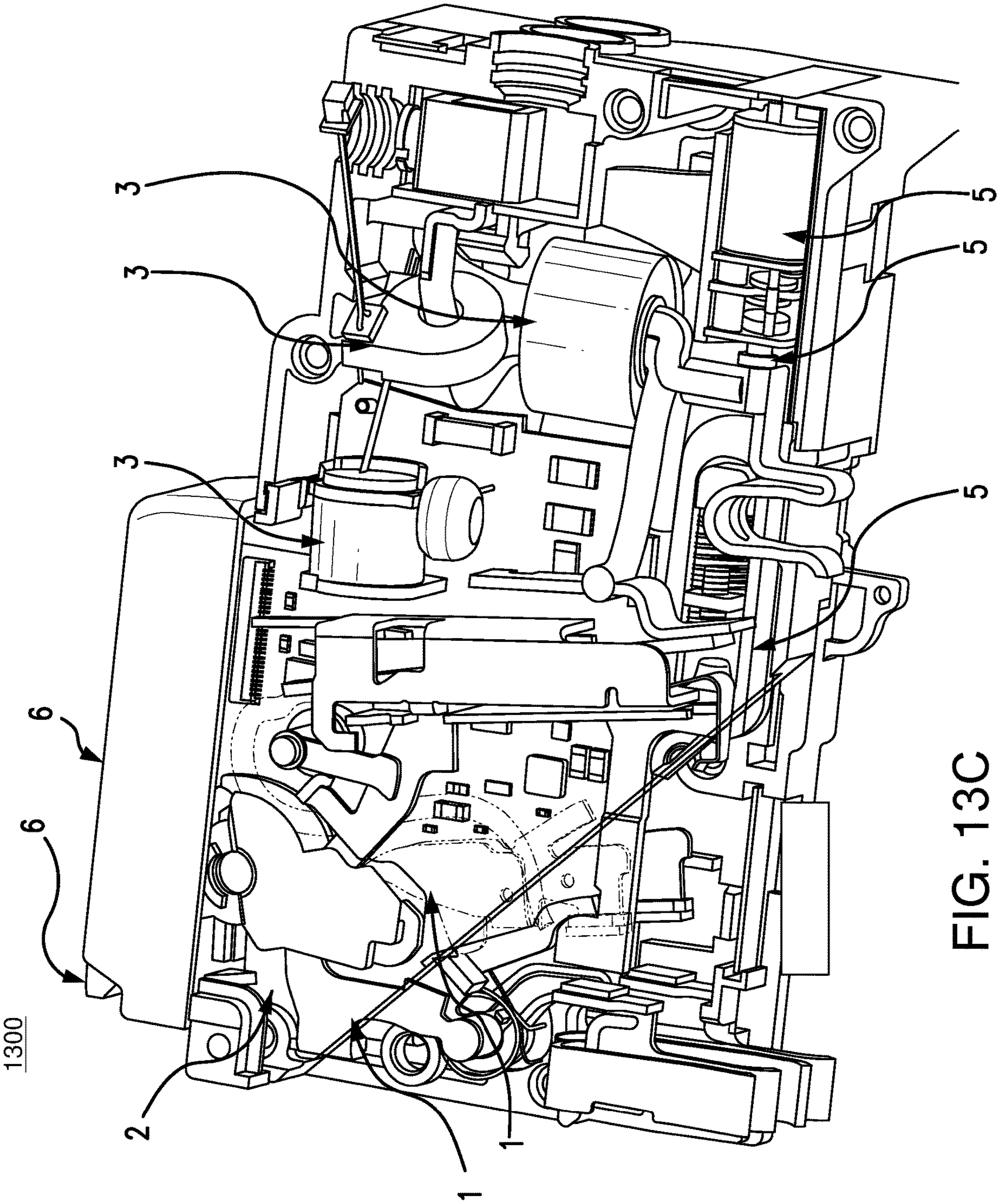
FIG. 13C shows a perspective view of the embodiment of FIG. 13B.
Figure 13D:
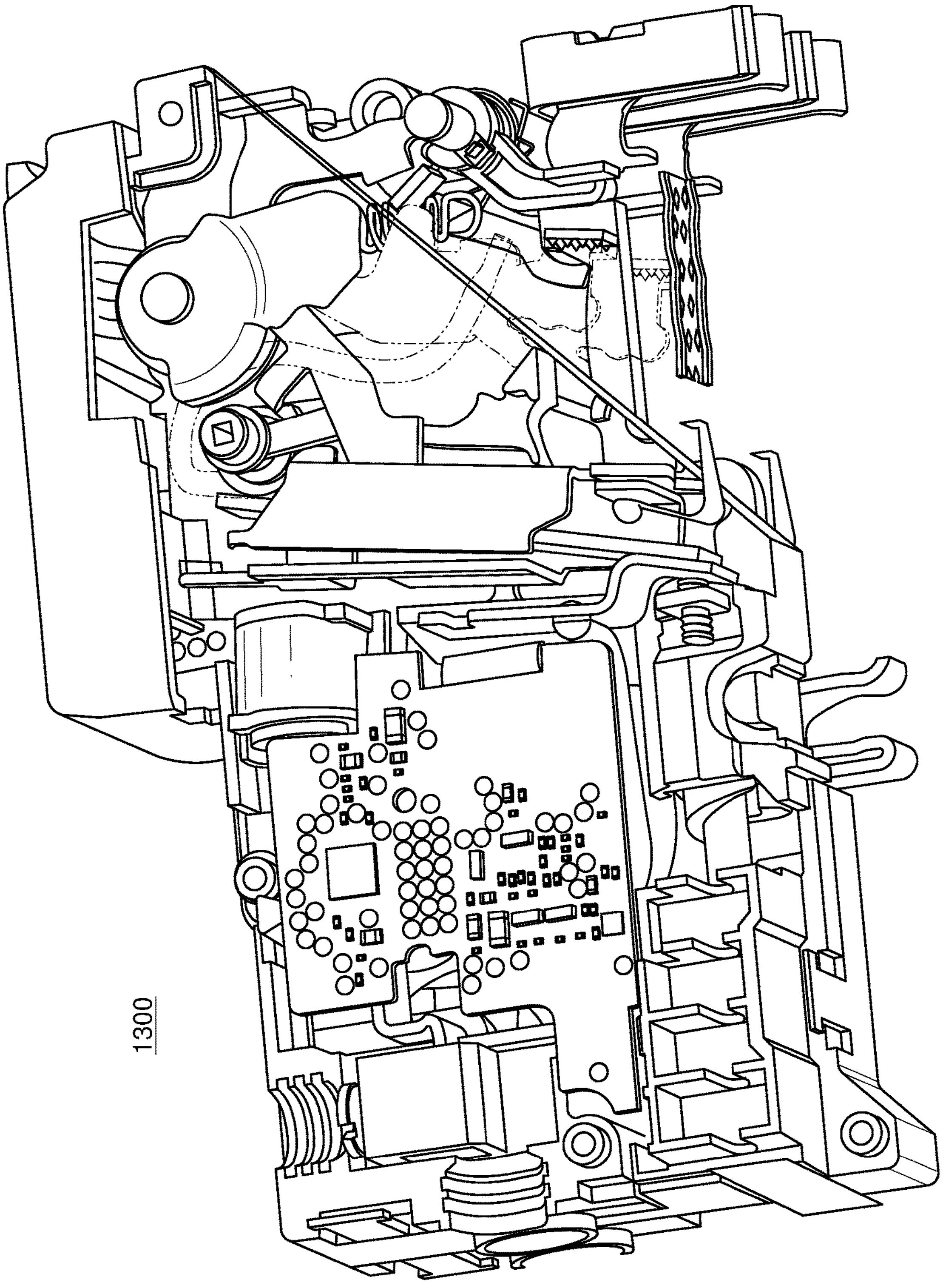
FIG. 13D shows an opposite side perspective view of the embodiment of FIG. 13B, shown with an opposite side housing portion removed.
Figure 14:
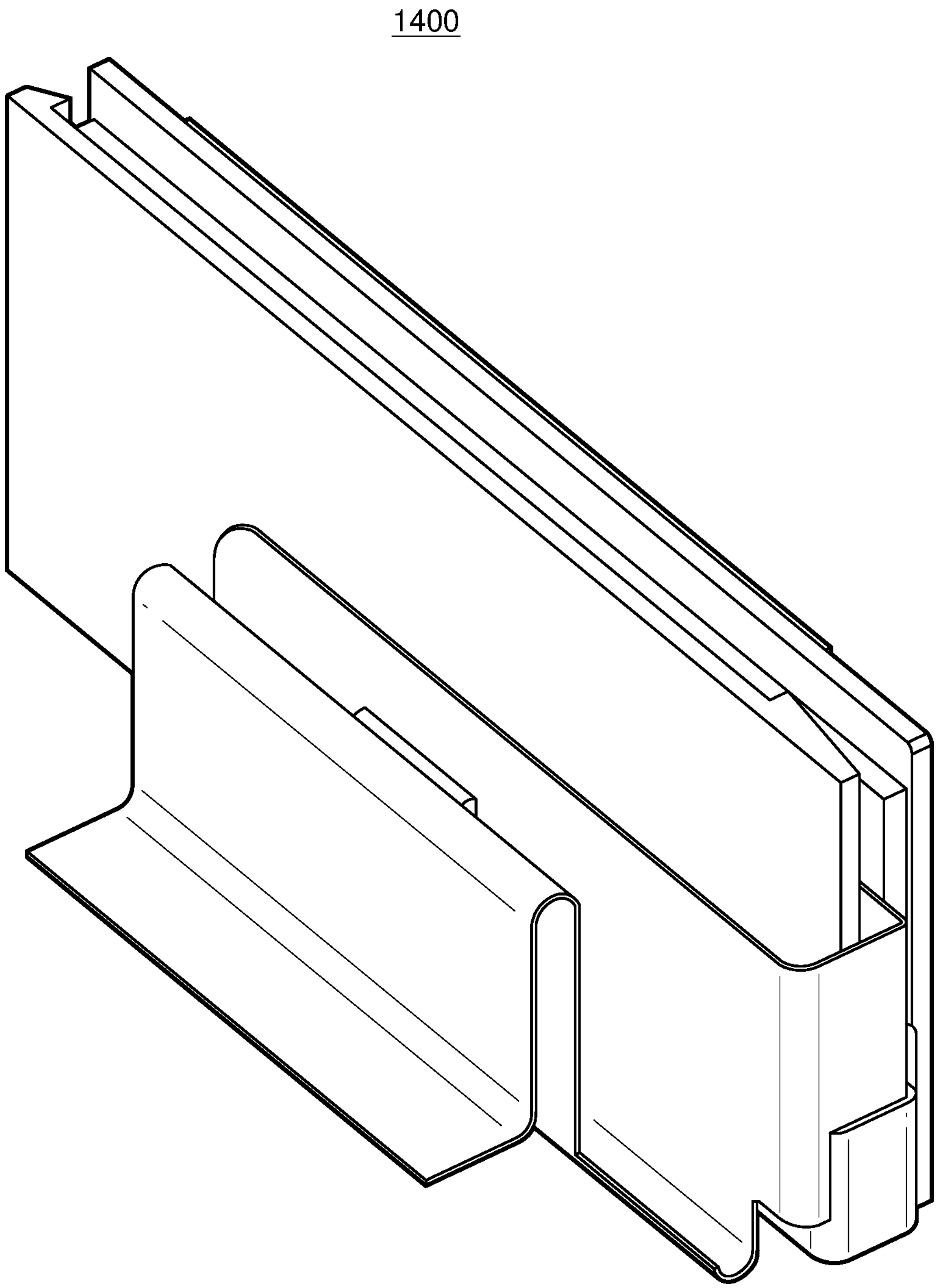
FIG. 14 shows a perspective view of an embodiment of a touch display used with the embodiments of FIGS. 12A and 13A.
Figure 15:
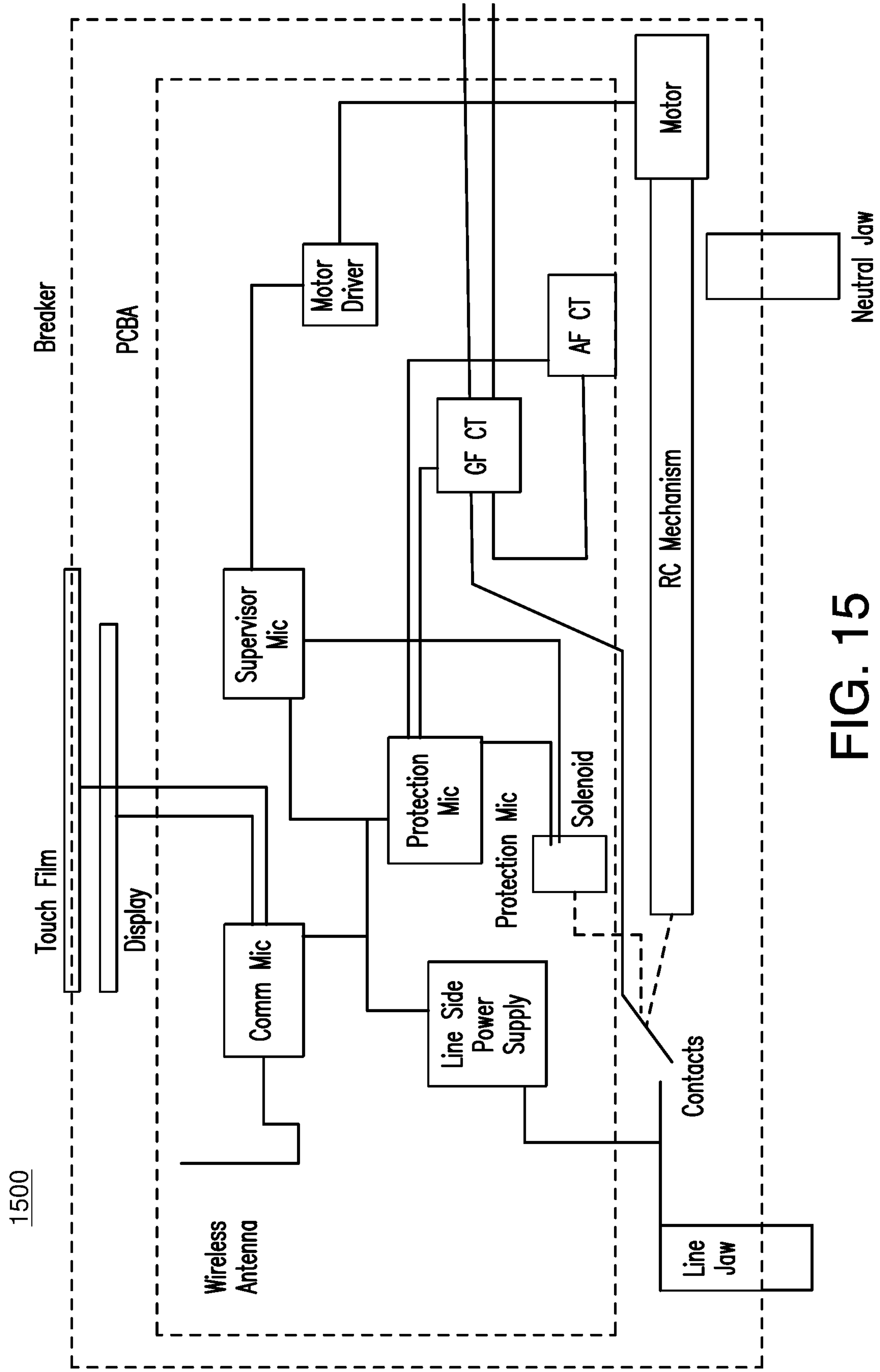
FIG. 15 shows a system diagram of an embodiment of a circuit breaker in accordance with this disclosure.

FIG. 12A shows a perspective view of an embodiment of a circuit breaker 1200 in accordance with this disclosure in a single pole format, showing interior components having a portion of housing removed. FIG. 12B shows a perspective view of the embodiment of FIG. 12A, shown having the contact in phantom. FIG. 13A shows a perspective view of an embodiment of a circuit breaker 1300 in accordance with this disclosure in a two pole format. FIG. 13B is a perspective partial internal view of the embodiment of FIG. 13A, showing interior components having a portion of a housing removed. FIG. 13C shows a perspective view of the embodiment of FIG. 13B. FIG. 13D shows a opposite side perspective view of the embodiment of FIG. 13B, shown with an opposite side housing portion removed. FIG. 14 shows a perspective view of an embodiment of a touch display 1400 used with the embodiments of FIGS. 12A and 13A. FIG. 15 shows a system diagram of an embodiment of a circuit breaker 1500 in accordance with this disclosure.

Referring to FIGS. 12A-15, embodiments can have each element designed to enable packaging in a standard breaker (e.g., single pole, double pole, or other multi-pole) without extra width or depth, for example. Embodiments can accomplish this via the following combination of components:

For example, as shown in FIGS. 12B and 13B, the circuit breaker mechanism 1 (e.g., and associated components) can have a single plane design, e.g., as shown. Such embodiments can use less than half of a pole space in width. The narrow width can enable additional features adjacent (e.g., lateral) to the breaker mechanism. Such embodiments can also provide thermal and magnetic protection.

The printed circuit board assembly (PCBA) 2 can have single plane design. Such embodiments can use less than half of a pole space in width. The narrow width of the PCBA and mechanism(s) allows them to be placed adjacently to each other. Such a PCBA can hold and interconnect advanced function protection and advanced feature components efficiently. The PCBA can interface to the user interface (UI), handle indication sensors, LEDs, line side power, motor, and wireless communication. The PCBA can include onboard wireless that negates the need for another external communication connection (e.g., via cables). The single plane PCBA can include multiple micro controllers (MIC) to coordinate all functions. In certain embodiments having 2-poles, the PCBA may not be in a single plane.

Advanced function protection features 3 can be compact. For example, embodiments can include taller components located after that mechanism. Embodiments can include a compact solenoid, sensors, and current path package that allows for more features to be added. Embodiments can reuse arc fault current transformers (CTs) for current measurement. Embodiments can provide arc fault, ground fault, and grounded neutral protection. Embodiments can communicate a trip type over wireless or through the UI.

Line side power (LSP) 4 can be utilized to power the PCBA and associated electronic components. The PCBA adjacent to the mechanism up to jaw(s) can allow a short connection path. A small connection between jaw(s) and the PCBA allows room for more features. Traditional breaker power supplies turn off when breaker trips, but LSP allows the breaker itself to stay powered even after the breaker trips. Staying powered allows communications, display, LED, remote control, and other functions to continue after a trip or manual handle off. Line side power and related power supply enables all PCBA functions to run, including demands from the remote control motor. No other connections for external power are needed, even to run the remote control motor, and no space consuming power storage devices are required.

The remote control mechanism 5 can have a single plane compact design (e.g., a flat slider component). This mechanism can utilize area that was left open by other sub systems. Such embodiments can act on existing main contacts inside the circuit breaker preventing addition of more contacts and related parts. For example, the circuit breaker can include a one or more planar linkage components that link the remote control mechanism to the breaker mechanism (e.g., the contact blade), which is also the same breaker mechanism manually actuated directly or indirectly by the manual handle. Embodiments can have a high mechanical force conversion so electrical power motor demands can be minimal. Embodiments can have fast acting opening and closing achieved through release of stored spring energy, for example. Embodiments can include a closed loop slider 7 (e.g., as shown) that increases strength and stiffness overcoming the narrow width allowed. Embodiments can include a means to interface from the slider plane of motion to the mechanism(s) plane of motion through a common pivot(s) and/or one or more linkages. In this regard, the breaker mechanism and the remote control mechanism can reside on different planes to efficiently occupy the free width of the assembly.

The user interface (UI) 6 can include a reduced handle shape to allow more room for other features in or on the breaker escutcheon, Embodiments can include a light pipe under the handle as a segment of the case to broadcast information of breaker status. The light pipe can be offset completely to one end of the escutcheon to allow room for other features, for example (e.g., as shown in FIG. 5). The UI can include a display and touch film components that can maximize usable area in the breaker escutcheon. The display can have one region that is permanently marked and a second region that is used to display variable information including text and images. The display region can be bistable, for example, which can keep the screen image even with no power applied. The display cable and touch film cable placement, routing, and bends can be configured to interface with the PCBA with minimal occupied volume (e.g., U shaped ribbons as shown in FIG. 14, e.g., separate cables or combined into a single cable as shown). For example, both cables can have routing that follows the following path: 90°-90°-180°-180°-90°, which is five bends in total (e.g., for single pole structure). Both cables can have routing that follows the following path: 90°-90°-180°-90°, which is 4 bends in total (e.g., for two pole structures). The display and touch film mechanical design can be configured to withstand impact test requirements by allowing flex. The display and touch film dielectric can be designed to achieve high voltage dielectric requirements by using a bead of sealant around the top and bottom edges.

Embodiments can provide a best in class advanced protection circuit breaker (e.g., having functions to protect against arc fault, ground fault, thermal and magnetic issues) and can also include 1) a compact stored energy motor mechanism to open and close the electrical contacts via remote control, 2) a mechanical means to link the remote control mechanism to the traditional primary electrical contacts, 3) a motor control circuit that integrates with the protection, communication, and supervisory circuits in the breaker, 4) a radio transmitter and receiver communication system to connect to the remote control means, 5) an innovative bistable display that can show local users rich variable dynamic information about breaker status, fault parameters, QR codes, circuit identifiers and can also has permanent markings for UL standards testing compliance, 6) two regions of touch function on the display, one to initiate UL standards user test checks and the other for the user to interact with the display to get other information and change the state of the breaker to open or closed (any suitable number of touch regions is contemplated herein), and 7) the software and firmware to execute all the functions of the other elements. Embodiments can use line side power to allow the circuit breaker electronics to remain powered when the main contacts are open. Embodiments can utilize other existing components like CT's to provide added power measurement functionality without increasing size or weight.

In certain embodiments, the background color of the display can be changed when the contacts are open or closed. For example, the display can be configured with a black background and white text when the contacts are closed, and a white background with black text when the contacts are open. In certain embodiments, the remote-control motor can be operated from the local display using a command accessed using a touch area of the display assembly to receive a local command to change the state of the remote-control mechanism to move the contacts to the opposite position.

In accordance with at least one aspect of this disclosure, a circuit breaker can include a set of electrical contacts configured to move between an open position and a closed position, a remote control motor, a remote control mechanism connected to the remote control motor and configured to cause the electrical contacts to move to the open position or the closed position via remote control of the remote control motor, a mechanical assembly configured to link the remote control mechanism to the electrical contacts, a wireless transmitter and receiver communication system, and a circuit board, comprising a protection module configured to provide arc fault protection, and ground fault protection, a wireless communication module operatively connected to the radio transmitter and receiver communication system to provide wireless communication, and a motor control module configured to control the motor based on one or more wireless commands from a user or external system. In certain embodiments, the thermal protection and magnetic protection can be provided by an electromechanical solution, for example. The circuit breaker also includes a bistable display configured to show variable dynamic information relating to breaker status, fault parameters, QR codes, circuit identifiers, or other information. The circuit board can be connected to line side power to stay powered regardless of the position of the electrical contacts.

In accordance with at least one aspect of this disclosure, a remote control circuit breaker can include a one or more components configured to move a set of electrical contacts from a closed position to an open position to provide electrical protection to a circuit, a remote controlled motor, and a circuit board configured to control the motor and to provide wireless communication to allow a user or external system to wirelessly control the motor, wherein the circuit board is configured to connect to line side power to stay powered regardless of the position of the electrical contacts. The remote control circuit breaker can also include a display (e.g., a bistable display) connected to the circuit board to be controlled by the circuit board. In the event of a power loss on the line side, a bistable display can continue to show the last state of the circuit breaker without requiring any supplemental power sources.

In accordance with at least one aspect of this disclosure, a circuit breaker can include a means for providing arc fault protection, ground fault protection, thermal protection, magnetic protection, remote control of contact state, and a user interface with a variable image display in a standard size circuit breaker format. Embodiments do not require additional space over standard size breaker formats (e.g., single pole, two pole, etc.).

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A circuit breaker, comprising:

a housing configured to fit within a slot of a circuit panel;

a display configured to display information, wherein the display includes:

a touch zone configured to allow touch inputs;

a variable image zone configured to display trip information, status information, and/or label information; and a fixed image zone configured to display fixed text that is at least partially coincident with the touch zone;

a mechanical handle configured to move between an ON position and an OFF position; and a trip light on the housing behind the mechanical handle, wherein the mechanical handle is configured to hide at least a portion of the trip light in the ON position, and wherein the mechanical handle is configured to reveal the trip light in the OFF position.

2. The circuit breaker of claim 1, wherein the fixed image zone is printed text.

3. The circuit breaker of claim 2, wherein the variable image zone is a bistable display configured to maintain the displayed image without active power.

4. The circuit breaker of claim 3, wherein the bistable display includes a landscape text display such that the text is in-line with a long direction of the housing.

5. The circuit breaker of claim 4, wherein the fixed image zone includes text orthogonal to the bistable display landscape text.

6. The circuit breaker of claim 5, wherein the fixed image zone includes a "TEST" box coincident with the touch zone.

7. The circuit breaker of claim 6, wherein the touch zone is larger than the "TEST" box, wherein the touch zone is coincident with the bistable display and the fixed display zone.

8. The circuit breaker of claim 1, further comprising a logic module configured to cause the display to show a label in a normal ON state, display the results of a test in a test state, and trip information in a tripped state.

9. The circuit breaker of claim 8, wherein the logic module is configured to cause the display to show the label in a mechanical or digitally commanded off state.

10. The circuit breaker of claim 2, wherein the logic module is configured to control a light state based on a state of the breaker, wherein the logic module is configured to illuminate the trip light to be solid or blinking in one or more patterns to indicate a trip, test status, or other condition to a user and to be off in a normal ON state.

11. The circuit breaker of claim 10, wherein each of a trip, test status, or other condition includes a unique blinking pattern.

12. The circuit breaker of claim 8, wherein the logic module is configured to turn the circuit breaker off in response to a digital command, wherein the mechanical handle is not moved to the OFF position, wherein the logic module is configured to display a digital "OFF" label indicating the breaker is off.

13. The circuit breaker of claim 1, wherein the circuit breaker has a standard size circuit breaker format.

14. The circuit breaker of claim 1, wherein the mechanical handle further includes a trip position between the ON position and the OFF position.

15. The circuit breaker of claim 12, wherein the mechanical handle is configured to reveal the trip light in the trip position.

16. The circuit breaker of claim 1, wherein the mechanical handle includes an "ON" label at a portion thereof that is visible in the ON position, wherein the mechanical handle is configured to move to cause the "ON" label to be blocked by the housing in the trip state and the OFF position.

17. The circuit breaker of claim 1, further comprising an "OFF" label disposed on the housing behind the handle, wherein the mechanical handle hides the "OFF" label in the "ON" position and in the trip position, wherein the mechanical handle reveals the "OFF" label in the OFF position.

18. A circuit breaker, comprising:

a housing configured to fit within a slot of a circuit panel;

a display configured to display information;

a logic module;

a trip light disposed on the housing; and a mechanical handle configured to move between an ON position and an OFF position, wherein the mechanical handle includes a trip position between the ON position and the OFF position, wherein the mechanical handle includes an "ON" label at a portion thereof that is visible in the ON position, wherein the mechanical handle is configured to move to cause the "ON" label to be blocked by the housing in the trip state and the OFF position, wherein the trip light is on the housing behind the mechanical handle, wherein the mechanical handle is configured to hide at least a portion of the trip light in the ON position, and wherein the mechanical handle is configured to reveal the trip light in the trip position and the OFF position, wherein the logic module is configured to control a light state based on a state of the breaker, wherein the logic module is configured to illuminate the trip light to be solid or blinking in one or more patterns to indicate a trip, test status, or other condition to a user and to be off in a normal ON state.

19. The circuit breaker of claim 18, wherein the display is a bistable display.

20. The circuit breaker of claim 18, further comprising:

a set of electrical contacts configured to move between an open position and a closed position;

a remote control motor;

a remote control mechanism connected to the remote control motor and configured to cause the electrical contacts to move to the open position or the closed position via remote control of the remote control motor;

a mechanical assembly configured to link the remote control mechanism to the electrical contacts;

a wireless transmitter and receiver communication system; and a circuit board, comprising:

a protection module configured to provide arc fault protection, and ground fault protection;

a wireless communication module operatively connected to the wireless transmitter and receiver communication system to provide wireless communication;

a motor control module configured to control the motor based on one or more wireless commands from a user or external system; and a bistable display configured to show variable dynamic information relating to breaker status, fault parameters, QR codes, and/or circuit identifiers, wherein the circuit board is connected to line side power to stay powered regardless of the position of the electrical contacts.

21. The circuit breaker of claim 18, further comprising:

one or more components configured to move the set of electrical contacts from the closed position to the open position to provide electrical protection to a circuit;

a remote controlled motor; and a circuit board configured to control the motor and to provide wireless communication to allow a user or external system to wirelessly control the motor, wherein the circuit board is configured to connect to line side power to stay powered regardless of the position of the electrical contacts.

22. The circuit breaker of claim 18, further comprising:

a means for providing arc fault protection, ground fault protection, thermal protection, magnetic protection, and remote control of contactor state, wherein the circuit breaker has a standard size circuit breaker format.

23. A circuit breaker for providing protection of an electrical circuit connected thereto, comprising:

a housing configured to fit within a slot of a circuit panel;

a mechanical handle configured to move between an ON position and an OFF position, wherein the mechanical handle includes a trip position between the ON position and the OFF position, wherein the mechanical handle is configured to move from the ON position to the trip position in response to a trip condition; and a trip light on the housing, the trip light configured to be illuminated to indicate a trip which opens the electrical circuit providing protection, wherein the mechanical handle is configured to hide at least a portion of the trip light in the ON position and to reveal the trip light in the trip position and the OFF position.

* * * * *